US011171925B2

(12) United States Patent
Yang et al.

(10) Patent No.: US 11,171,925 B2
(45) Date of Patent: *Nov. 9, 2021

(54) EVALUATING AND MODIFYING COUNTERMEASURES BASED ON AGGREGATE TRANSACTION STATUS

(71) Applicant: Shape Security, Inc., Mountain View, CA (US)

(72) Inventors: Siying Yang, Cupertino, CA (US); Justin D. Call, Santa Clara, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,717

(22) Filed: Aug. 6, 2019

(65) Prior Publication Data

US 2019/0364019 A1 Nov. 28, 2019

Related U.S. Application Data

(63) Continuation of application No. 14/925,547, filed on Oct. 28, 2015, now Pat. No. 10,375,026.

(51) Int. Cl.
*H04L 29/06* (2006.01)
*H04L 29/08* (2006.01)

(52) U.S. Cl.
CPC ...... *H04L 63/0281* (2013.01); *H04L 63/1416* (2013.01); *H04L 63/1483* (2013.01);
(Continued)

(58) Field of Classification Search
None
See application file for complete search history.

(56) References Cited

U.S. PATENT DOCUMENTS 5,509,076 A 4/1996 Sprunk
6,654,707 B2 11/2003 Wynn et al.
(Continued)

FOREIGN PATENT DOCUMENTS

CN 101471818 5/2011
WO WO2008/095018 8/2008
(Continued)

OTHER PUBLICATIONS

NOA, mailed on Feb. 7, 2019, re: Siying Yang, U.S. Appl. No. 16/190,015, filed Nov. 13, 2018.
(Continued)

*Primary Examiner* — Arezoo Sherkat
(74) *Attorney, Agent, or Firm* — Troutman Pepper Hamilton Sanders LLP (Rochester)

(57) ABSTRACT

Techniques are provided for evaluating and modifying countermeasures based on aggregate transaction status. A first expression pattern is determined that occurs in each of first response messages served by the web server system in response to successful transactions of the transaction type. A second expression pattern is determined that occurs in each of second response messages served by the web server system in response to non-successful transactions of the transaction type requested. Aa status is determined for each of a plurality of transactions of the transaction type based on matching the first expression pattern or the second expression pattern to response messages served by the web server system. Aggregate status information for the transaction type based on the status for the set of operations is updated. Based on a change in the aggregate status information, a set of one or more security countermeasures is updated.

20 Claims, 9 Drawing Sheets

(52) U.S. Cl.
CPC ............ *H04L 63/20* (2013.01); *H04L 63/306* (2013.01); *H04L 67/22* (2013.01); *H04L 67/2842* (2013.01); *H04L 63/168* (2013.01)

(56) References Cited

U.S. PATENT DOCUMENTS

| | | | |
|---|---|---|---|
| 7,058,699 | B1 | 6/2006 | Chiou et al. |
| 7,107,347 | B1 | 9/2006 | Cohen |
| 7,398,553 | B1 | 7/2008 | Li |
| 7,424,720 | B2 | 9/2008 | Chagoly |
| 7,464,326 | B2 | 12/2008 | Kawai et al. |
| 7,849,502 | B1 | 12/2010 | Bloch et al. |
| 7,870,610 | B1 | 1/2011 | Mitchell et al. |
| 7,895,653 | B2 | 2/2011 | Calo et al. |
| 8,170,020 | B2 | 5/2012 | Oliver et al. |
| 8,195,953 | B1 | 6/2012 | Yue et al. |
| 8,453,126 | B1 | 5/2013 | Ganelin |
| 8,555,388 | B1 | 10/2013 | Wang et al. |
| 8,561,193 | B1 | 10/2013 | Srivastava et al. |
| 8,578,499 | B1 | 11/2013 | Zhu et al. |
| 8,589,405 | B1 | 11/2013 | Estan |
| 8,615,804 | B2 | 12/2013 | Mui et al. |
| 8,650,648 | B2 | 2/2014 | Howard et al. |
| 8,677,481 | B1 | 3/2014 | Lee |
| 8,689,330 | B2 | 4/2014 | Sinn et al. |
| 8,713,684 | B2 | 4/2014 | Bettini et al. |
| 8,726,394 | B2 | 5/2014 | Maor et al. |
| 8,739,284 | B1 | 5/2014 | Gardner |
| 8,752,208 | B2 | 6/2014 | Shulman et al. |
| 8,762,962 | B2 | 6/2014 | Ben-Artzi et al. |
| 8,843,820 | B1 | 9/2014 | Kay et al. |
| 8,849,985 | B1 | 9/2014 | Colton et al. |
| 8,997,226 | B1 | 3/2015 | Call et al. |
| 9,027,142 | B1* | 5/2015 | Call ................ H04L 63/1416 726/25 |
| 9,043,924 | B2 | 5/2015 | Maor et al. |
| 9,158,893 | B2 | 10/2015 | Call et al. |
| 9,225,729 | B1 | 12/2015 | Moen et al. |
| 9,225,737 | B2 | 12/2015 | Call et al. |
| 9,258,328 | B2 | 2/2016 | Ibatullin et al. |
| 9,456,050 | B1 | 9/2016 | Lepeska |
| 9,537,888 | B1 | 1/2017 | McClintock et al. |
| 9,609,006 | B2 | 3/2017 | Call et al. |
| 9,628,498 | B1 | 4/2017 | Aziz et al. |
| 9,639,699 | B1 | 5/2017 | Kurupati |
| 9,646,140 | B2 | 5/2017 | Horadan |
| 9,680,850 | B2 | 6/2017 | Rapaport et al. |
| 9,686,300 | B1 | 6/2017 | Kurupati |
| 9,705,902 | B1 | 7/2017 | Call et al. |
| 9,906,544 | B1 | 2/2018 | Kurupati |
| 10,165,004 | B1 | 12/2018 | Mehta et al. |
| 2002/0194219 | A1 | 12/2002 | Bradley et al. |
| 2002/0199116 | A1 | 12/2002 | Hoene et al. |
| 2004/0088651 | A1 | 5/2004 | McKnight et al. |
| 2005/0108554 | A1 | 5/2005 | Rubin |
| 2005/0172338 | A1 | 8/2005 | Sandu |
| 2005/0198099 | A1 | 9/2005 | Motsinger |
| 2005/0216770 | A1 | 9/2005 | Rowett et al. |
| 2005/0240999 | A1 | 10/2005 | Rubin et al. |
| 2005/0251536 | A1 | 11/2005 | Harik |
| 2005/0278626 | A1 | 12/2005 | Malik |
| 2006/0053295 | A1 | 3/2006 | Madhusudan et al. |
| 2006/0101047 | A1 | 5/2006 | Rice |
| 2006/0174323 | A1 | 8/2006 | Brown et al. |
| 2006/0195588 | A1 | 8/2006 | Pennington et al. |
| 2006/0230288 | A1 | 10/2006 | Fox |
| 2006/0288418 | A1 | 12/2006 | Yang et al. |
| 2007/0011295 | A1 | 1/2007 | Hansen |
| 2007/0064617 | A1 | 3/2007 | Reves |
| 2007/0088955 | A1 | 4/2007 | Lee |
| 2007/0234070 | A1 | 10/2007 | Horning et al. |
| 2007/0266149 | A1* | 11/2007 | Cobb ................ H04L 41/5009 709/224 |
| 2008/0208785 | A1 | 8/2008 | Trefler et al. |
| 2008/0320567 | A1 | 12/2008 | Shulman et al. |
| 2009/0070459 | A1 | 3/2009 | Cho et al. |
| 2009/0099988 | A1 | 4/2009 | Stokes et al. |
| 2009/0199297 | A1 | 8/2009 | Jarrett et al. |
| 2009/0241174 | A1 | 9/2009 | Rajan et al. |
| 2009/0292791 | A1 | 11/2009 | Livshits et al. |
| 2010/0088404 | A1 | 4/2010 | Mani |
| 2010/0106611 | A1 | 4/2010 | Paulsen |
| 2010/0142382 | A1* | 6/2010 | Jungck ................ H04L 63/0245 370/242 |
| 2010/0186089 | A1 | 7/2010 | Fu et al. |
| 2010/0218253 | A1 | 8/2010 | Sutton et al. |
| 2010/0235637 | A1 | 9/2010 | Lu et al. |
| 2010/0235910 | A1 | 9/2010 | Ku et al. |
| 2010/0287132 | A1 | 11/2010 | Hauser |
| 2011/0035733 | A1 | 2/2011 | Horning et al. |
| 2011/0154308 | A1 | 6/2011 | Lobo |
| 2011/0225234 | A1 | 9/2011 | Amit et al. |
| 2011/0231305 | A1 | 9/2011 | Winters |
| 2011/0320816 | A1 | 12/2011 | Yao et al. |
| 2012/0036576 | A1 | 2/2012 | Iyer |
| 2012/0090030 | A1 | 4/2012 | Rapaport et al. |
| 2012/0198528 | A1 | 8/2012 | Baumhof |
| 2012/0254727 | A1 | 10/2012 | Jain |
| 2012/0255006 | A1 | 10/2012 | Aly et al. |
| 2012/0324236 | A1 | 12/2012 | Srivastava et al. |
| 2013/0047255 | A1 | 2/2013 | Dalcher |
| 2013/0086679 | A1 | 4/2013 | Beiter |
| 2013/0219492 | A1 | 8/2013 | Call et al. |
| 2013/0239195 | A1 | 9/2013 | Turgeman |
| 2013/0263264 | A1 | 10/2013 | Klein et al. |
| 2013/0273882 | A1 | 10/2013 | Walsh |
| 2014/0040051 | A1 | 2/2014 | Ovick |
| 2014/0096194 | A1 | 4/2014 | Bhogavilli et al. |
| 2014/0101236 | A1 | 4/2014 | Dietrich et al. |
| 2014/0208198 | A1 | 7/2014 | Ayoub et al. |
| 2014/0298469 | A1 | 10/2014 | Marion et al. |
| 2014/0304816 | A1 | 10/2014 | Klein et al. |
| 2014/0310392 | A1* | 10/2014 | Ho ................ H04L 67/02 709/223 |
| 2015/0058992 | A1 | 2/2015 | El-Moussa |
| 2015/0067031 | A1 | 3/2015 | Acharya |
| 2015/0067866 | A1 | 3/2015 | Ibatullin et al. |
| 2015/0112892 | A1 | 4/2015 | Kaminsky et al. |
| 2015/0262183 | A1 | 9/2015 | Gervais |
| 2015/0278491 | A1 | 10/2015 | Horning et al. |
| 2015/0281263 | A1 | 10/2015 | McLaughlin et al. |
| 2015/0358338 | A1* | 12/2015 | Zeitlin ................ H04L 63/1416 726/23 |
| 2015/0379266 | A1 | 12/2015 | McLaughlin et al. |
| 2016/0005029 | A1 | 1/2016 | Ivey |
| 2016/0072829 | A1 | 3/2016 | Call et al. |
| 2016/0119344 | A1 | 4/2016 | Freitas Fortuna dos Santos et al. |
| 2016/0191554 | A1 | 6/2016 | Kaminsky |
| 2016/0342793 | A1 | 11/2016 | Hidayat |
| 2016/0344769 | A1 | 11/2016 | Li |
| 2016/0378989 | A1 | 12/2016 | Park |
| 2017/0012960 | A1 | 1/2017 | Idika |
| 2017/0013012 | A1 | 1/2017 | Hansen |
| 2017/0048260 | A1 | 2/2017 | Peddemors et al. |
| 2017/0201540 | A1 | 7/2017 | Call |
| 2017/0235954 | A1 | 8/2017 | Kurupati |
| 2017/0237766 | A1 | 8/2017 | Mattson |
| 2017/0257383 | A1 | 9/2017 | Ficarra |
| 2017/0257385 | A1 | 9/2017 | Overson |
| 2017/0293748 | A1 | 10/2017 | Kurupati |
| 2018/0205747 | A1 | 7/2018 | Ficarra |
| 2018/0255154 | A1 | 9/2018 | Li |
| 2019/0081977 | A1 | 3/2019 | Yang |
| 2019/0141064 | A1 | 5/2019 | Call |
| 2019/0182251 | A1 | 6/2019 | Jampani |
| 2019/0215304 | A1 | 7/2019 | Yang |
| 2019/0245858 | A1 | 8/2019 | Idika |
| 2019/0268359 | A1 | 8/2019 | Zhang |
| 2019/0327265 | A1 | 10/2019 | Zhao |
| 2019/0364019 | A1 | 11/2019 | Yang |

(56) References Cited

U.S. PATENT DOCUMENTS

2019/0373012 A1   12/2019   Mattson
2019/0394228 A1   12/2019   Yang

FOREIGN PATENT DOCUMENTS

| WO | WO2008/095031 | 8/2008 |
|---|---|---|
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF, mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
CTNF, mailed on May 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA, mailed on Dec. 24, 2014, re: Justin Call, U.S. Appl. No. 14/255,248, filed Apr. 17, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. Appl. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on Mar. 17, 2016, re: Justin Call, U.S. Appl. No. 14/672,879, filed Mar. 30, 2015.
CTNF, mailed on Nov. 10, 2016, re: Nwokedi Idike, U.S. Appl. No. 14/728,621, filed Jun. 2, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oct. 19, 2017, re: Jarrod S. Overson, U.S. Appl. No. 15/059,080, filed Mar. 2, 2016.
NOA, mailed on Oct. 25, 2017, re: Michael J. Ficarra, U.S. Appl. No. 15/060,322, filed Mar. 3, 2016
CTNF, mailed on Nov. 13, 2017, re: Nwokedi Idike, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
CTFR, mailed on Jan. 25, 2018, re: Siying Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idike, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
CTNF, mailed on Jun. 29, 2018, re: Timothy Dylan Peacock, U.S. Appl. No. 15/137,824 , filed Apr. 25, 2016.
CTNF, mailed on Feb. 1, 2018, re: Nwokedi Idika, U.S. Appl. No. 15/204,710, filed Jul. 7, 2016.
NOA, mailed on Aug. 13, 2018, re: Daniel G. Moen, U.S. Appl. No. 14/980,231, filed Dec. 28, 2015.
NOA, mailed on Sep. 5, 2018, re: Daniel G. Moen, U.S. Appl. No. 14/980,231, filed Dec. 28, 2015.
NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,034, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.

(56) References Cited

OTHER PUBLICATIONS

CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 29, 2018, re: Jarrod S. Overson, U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.
CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTFR, mailed on Jul. 1, 2019, re: Nwokedi Idika , U.S. Appl. No. 14/728,596, filed Jun. 2, 2015.
CTNF, mailed on Sep. 4, 2019, re: Timothy Dylan Peacock, U.S. Appl. No. 15/137,824, filed Apr. 25, 2016.
CTNF, mailed on Aug. 14, 2019, re: Nwokedi Idika, U.S. Appl. No. 16/236,520, filed Dec. 30, 2018.
CTNF, mailed on Sep. 4, 2019, re: Justin D. Call, U.S. Appl. No. 16/234,848, filed Dec. 28, 2018.
CTNF, mailed on Sep. 4, 2019, re: Bei Zhang, U.S. Appl. No. 16/413,451, filed May 15, 2019.
NOA, mailed on Oct. 3, 2019, re: Marc R. Hansen, U.S. Appl. No. 15/202,755, filed Jul. 6, 2016.
CTNF, mailed on Sep. 24, 2019, re: Ganesh Jampani, U.S. Appl. No. 16/259,890, filed Jan. 28, 2019.
NOA, mailed on Oct. 17, 2019, re: Michael J. Ficarra, U.S. Appl. No. 15/060,380, filed Mar. 3, 2016.
NOA, mailed on Dec. 3, 2019, re: Nwokedi Idika, U.S. Appl. No. 16/236,520, filed Dec. 30, 2018.
CTNF, mailed on Dec. 11, 2019, re: Siying Yang, U.S. Appl. No. 16/236,519, filed Dec. 30, 2018.
NOA, mailed on Dec. 11, 2019, re: Jarrod S. Overson, U.S. Appl. No. 15/059,080, filed Mar. 2, 2016.
U.S. Appl. No. 16/457,589, filed Oct. 24, 2019, Zhiwei Li.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.

\* cited by examiner

Transactions from Banking Website

| Transaction | Step | API |
|---|---|---|
| Login | Request | GET /login.php?username=gjohnson&password=abcd1234<br>Host: www.example-bank.com |
| | Successful Response | Response code: 200 OK<br>HTTP body text: "Welcome to example-bank!" |
| | Failed Response | Response code: 200 OK<br>HTTP body text: "Incorrect username or password!" |
| Create Account | Request | GET /register.php?username=gjohnson&password=abcd1234&ssn=123456789&dob=01011990<br>Host: www.example-bank.com |
| | Successful Response | Response code: 200 OK<br>HTTP body text: "Account 'gjohnson' successfully created!" |
| | Failed Response | Response code: 200 OK<br>HTTP body text: "Username 'gjohnson' already exists." |
| Money Transfer | Request | GET /transfer.php?from_account=gjohnson&to_account=thomaslee&amount=1000.00<br>Host: www.example-bank.com |
| | Successful Response | Response code: 200 OK<br>HTTP body text: "$1000.00 transferred!" |
| | Failed Response | Response code: 403 Forbidden<br>HTTP body text: "Internal server error." |

Transaction 1 (202)
Transaction 2 (204)
Transaction 3 (206)

Transactions from Photo Sharing Website

| Transaction | Step | API |
|---|---|---|
| Login | Request | GET /sign-in.php?username=gjohnson&password=abcd1234<br>Host: www.example-photo.com |
| | Successful Response | Response code: 200 OK<br>HTTP body text: "Successfully signed in!" |
| | Failed Response | Response code: 401 Unauthorized<br>HTTP body text: "Incorrect credentials" |
| Create Account | Request | GET /create.php?username=gjohnson&password=abcd1234&ssn=123456789&dob=01011990<br>Host: www.example-photo.com |
| | Successful Response | Response code: 200 OK<br>HTTP body text: "Created account 'gjohnson'." |
| | Failed Response | Response code: 400 Bad Request<br>HTTP body text: "Duplicated username." |
| Share Photo | Request | GET /share.php?photo_index=1234&type=public<br>Host: www.example-bank.com |
| | Successful Response | Response code: 200 OK<br>HTTP body text: "Successfully shared this picture." |
| | Failed Response | Response code: 403 Forbidden<br>HTTP body text: "This operation is not allowed." |

Transaction 1 (208), Transaction 2 (210), Transaction 3 (212)

EVALUATING AND MODIFYING COUNTERMEASURES BASED ON AGGREGATE TRANSACTION STATUS

CROSS-REFERENCE TO RELATED APPLICATIONS; BENEFIT CLAIM

This application claims the benefit under 35 U.S.C. § 120 as a Continuation of U.S. patent application Ser. No. 14/925,547, filed on 2015 Oct. 28, the entire contents of which are hereby incorporated by reference as if fully set forth herein.

FIELD OF THE DISCLOSURE

The subject matter of this document generally relates to computer security, including by analyzing web-based and other computer-based transactions.

BACKGROUND

Websites commonly serve content, such as web pages, which include interfaces to web-based applications that are programmed to perform a range of services for visitors of the websites. Some of these applications are capable of consummating transactions requested by the visitors. For example, websites that maintain private accounts for their users may provide, in a web page, a form that has username and password fields that allow a user to submit their credentials as needed to login to the user's account. A server-side application for the website may receive and process the user's credentials, and may then either allow or deny access to the account based on the validity of the submitted credentials. Other transactions that may be carried out with web-based applications include, for example, account updates, account logouts, commercial transactions (e.g., add-to-cart, purchase items), and financial transactions (e.g., transfer funds, securities transactions). As web-based applications often process users' private and sensitive information, and perform transactions pertaining to users' sensitive matters, fraudsters and the like have attempted to exploit such applications to serve their own illicit ends.

SUMMARY

This document generally describes systems, methods, devices, and other techniques for improving the security of computer systems, including by monitoring online transactions. In particular, this document describes techniques by which data that indicates the results of online transactions can be collected, analyzed, and applied toward the improvement of computer security. Online transaction results can carry important information about the operational statuses of websites. A disproportionately large number of failed (unsuccessful) transactions, for example, may indicate that something is amiss, such as an operational defect in a host server. In some cases, increases in the number of failed transactions may indicate that an illicit attack is underway, such as a botnet carrying out a reconnaissance or denial-of-service (DoS) attack. Accordingly, the techniques described herein can provide for the tracking and analysis of online transaction results, so as to gain insight into the operational status of a web server.

In some implementations, insights gained through such tracking and analysis of transaction results can be used to take action that prevents, or that otherwise reduces the likelihood of successful exploitation of a web server. For example, the administrators of a website may utilize an intermediary computing system to act as a proxy to the website's host server(s). The intermediary computing system may provide security services for the website, such as the re-coding of initial web code provided from the host server(s), to apply one or more security countermeasures that interfere with the ability of malware to use the served code to carry out unauthorized transactions or to otherwise exploit the site's host server(s). To evaluate the efficacy of the applied countermeasures, the security intermediary may track online transaction results. Based on the detected statuses of one or more types of online transactions over a period of time, the security intermediary may adjust parameters of the applied countermeasures so as to optimize protection of the website against particular threats indicated by the online transaction results, for example. Aggregated results from online transactions may be used for other purposes as well, in some implementations. For example, the security intermediary may alert the host server(s) and/or administrators for a website when transaction results indicate the occurrence of abnormal activity.

One challenge that arises in tracking web transaction results is that the form of transaction results can be highly dependent on the particular implementation of a given web application. For example, one application may use HTTP response code to indicate success and failure, whereas another application may use HTTP response body text to indicate the same. Other applications may use a combination of distinct elements from HTTP response code, HTTP response body text, or both, to indicate the status (e.g., success or failure) of a transaction. This document describes techniques by which a security intermediary may automatically determine expression patterns that indicate distinctive characteristics of messages (e.g., web page code, HTTP requests and responses) that pertain to the status of a given type of transaction. For example, the expression pattern for a successful account login at a website may be text in the body of a webpage stating "Welcome back to Example-.com." The expression pattern for a failed account login attempt, on the other hand, may be an HTTP response code, such as "403 Forbidden." Other types of transactions at the website may have the same or different expression patterns. For example, a successful account creation transaction may be indicated by the body text "Congratulations on your new account," whereas a failed account creation transaction may be indicated by the body text in an HTTP response message, "We're sorry, your request is missing some information. Please try again." The expression patterns for these and other transaction types may be stored and be accessible by the security intermediary so that results can be tracked across a variety of transaction types, regardless of the particular implementation of applications that carry out the transactions (and thus regardless of the format in which the results are presented). The security intermediary may use the expression patterns to map unique results for each type of transaction to one of a defined set of statuses that can be applied to all transaction types, such as a successful transaction, a failed transaction, and a pending transaction (i.e., a transaction that has not yet completed or for which the server has not responded within a defined period of time to a request relating to the transaction).

In some implementations, a framework is provided that allows administrators to manually define expression patterns for use by the security intermediary to map each type of transaction to one of the defined set of universal statuses. As such, flexibility in the design of applications can be maintained so as to allow unique transaction result indicators for different transaction types, even as the security intermediary applies the pre-defined expression patterns to resolve such results to a particular status from among a set of statuses that are commonly applicable across multiple transaction types.

Some implementations of the subject matter described herein include a computer-implemented method. The method can include intercepting, at an intermediary computing system, messages communicated between a web server system and one or more client computing devices. A subset of the intercepted messages can be selected that are determined to commonly relate to a particular web transaction. The method can identify an expression pattern that occurs in the subset of the intercepted messages, and can determine that the identified expression pattern matches a first pre-defined expression pattern from among a plurality of different pre-defined expression patterns. The plurality of pre-defined expression patterns can respectively correspond to a plurality of different types of web transactions that are capable of being performed at least in part by the web server system. Each of the plurality of pre-defined expression patterns can indicate distinctive characteristics of messages that describe a particular status of the corresponding type of web transaction for the respective pre-defined expression pattern. A status of the particular web transaction can be determined based on the first pre-defined expression pattern that matches the identified expression pattern occurring in the subset of the intercepted messages. Information can be stored that indicates the determined status of the particular web transaction.

These and other implementations can optionally include one or more of the following features.

A type of the particular web transaction can be determined based on the first pre-defined expression pattern that matches the identified expression pattern occurring in the subset of the intercepted messages. The type of the particular web transaction can be one of an account creation transaction, a modify account settings transaction, a money transfer transaction, and a social media posting transaction.

Determining the status of the particular web transaction can include classifying the particular web transaction as one of a successful transaction, a failed transaction, and a pending transaction. In some implementations, pending transactions may include transactions for which a request to initiate the transaction has occurred, but for which the web server did not respond to the request within a pre-defined period of time from the request with a message that either acknowledges the request or that indicates another status of the transaction, such as success or failure.

A second pre-defined expression pattern from among the plurality of different pre-defined expression patterns can indicate distinctive characteristics of messages that describe a successful transaction status for a first type of web transaction. A third pre-defined expression pattern from among the plurality of different pre-defined expression patterns can indicate distinctive characteristics of messages that describe the successful transaction status for a different, second type of web transaction.

A fourth pre-defined expression pattern from among the plurality of different pre-defined expression patterns can indicate distinctive characteristics of messages that describe a failed transaction status for the first type of web transaction.

A fifth pre-defined expression pattern from among the plurality of different pre-defined expression patterns can indicate distinctive characteristics of messages that describe the failed transaction status for the different, second type of web transaction.

The intermediary computing system can access user-defined configuration data that specifies the plurality of pre-defined expression patterns. One or more of the plurality of pre-defined expression patterns may have been inputted into the configuration data as a result of user input specifying the expression patterns. At least some of the expression patterns can be generated based on output of a model that automatically determines distinctive characteristics of messages describing different statuses for different transaction types.

The first pre-defined expression pattern can indicate distinctive characteristics of at least one of body content and header content of messages that describe the status of the particular web transaction.

The first pre-defined expression pattern can specify a combination of distinct message components that collectively indicate distinctive characteristics of messages that describe the status of the particular web transaction.

Selecting the subset of the intercepted messages that are determined to commonly relate to a particular web transaction can include selecting a first message addressed from the web server system to a first of the client computing devices and selecting a second message addressed from the first of the computing devices to the web server system, the second message determined to be a responsive to the first message.

The first pre-defined expression pattern can include a plurality of constraints. Determining that the identified expression pattern matches the first pre-defined expression pattern can include determining that the plurality of constraints are satisfied by expressions in the subset of the intercepted messages.

The intermediary computing system can be configured as a proxy to the web server system such that incoming and outgoing messages from the web server system are routed through the intermediary computing system for processing before the incoming messages are provided to the web server system or before the outgoing messages are delivered to the one or more client computing devices.

A first message among the intercepted messages can include web code for a web page that is to be served to a first client computing device. The method can further include re-coding, at the intermediary computing system, the web code for the web page so as to obscure an operational design of the web server system that could be determined from the web code before the re-coding; and transmitting, from the intermediary computing system and to the first client computing device, the recoded web page for execution by the first client computing device.

The web code can be recoded at the intermediary computing system according to a set of security parameters that specify a manner in which particular messages are to be recoded. The method can further include adjusting the set of security parameters based on the determined status of the particular web transaction and statuses determined for other web transactions, so as to affect the manner in which the intermediary computing system recodes the particular messages.

The set of security parameters can be adjusted in response to determining that (i) a volume of unsuccessful web transactions over a period of time exceeds a threshold volume of unsuccessful web transactions, or that (ii) the volume of unsuccessful web transactions is changed over the period of time by an amount that exceeds a threshold amount.

The intermediary computing system can be configured to recode web pages in different manners across multiple different servings of the web pages. Storing the information that indicates the determined status of the particular web transaction can include generating a log entry that characterizes information about the particular web transaction.

Storing the information that indicates the determined status of the particular web transaction can include incrementing a counter that indicates a number of occurrences of other web transactions of a same type as the particular web transaction that were determined to have a same status as the particular web transaction.

The determined status of the particular web transaction can be that the particular web transaction was unsuccessful. The intermediate computing system can provide a notification to the web server system indicating that a number of occurrences of unsuccessful web transactions meets a threshold number of occurrences.

The first pre-defined expression pattern can indicate an HTTP response code that at least partially describes the status of the particular web transaction.

Some implementations of the subject matter described herein include a computing system, which may be arranged as a proxy to a web server system. The computing system can include an interface, a recoder, a template repository, and a transactions analyzer. The interface can be configured to intercept traffic between the web server system and client computing devices. The recoder can be configured to modify executable code served by the web server system, before the executable code is transmitted to one or more of the client computing devices, so as to interfere with the ability of software at the one or more client computing devices to determine an operational design of the web server system from the modified executable code that could be determined from the executable code before being modified. The template repository can be configured to store a plurality of expression pattern templates for multiple types of web transactions, each expression pattern template indicating a manner in which a particular status of web transactions of a type that corresponds to the expression pattern template is determinable from traffic relating to the web transactions. The transactions analyzer can be configured to associate portions of traffic intercepted by the computing system with particular types of web transactions, and to identify statuses of web transactions that are indicated by the portions of traffic by comparing expression patterns in the portions of traffic to one or more of the plurality of expression pattern templates.

These and other implementations can optionally include one or more of the following features.

The executable code that the recoder is configured to modify can include at least one of hypertext markup language (HTML) code, cascading style sheets (CSS) code, and JavaScript code for webpages.

A first expression pattern template, among the plurality of expression pattern templates and corresponding to a first type of web transaction, can indicate that statuses of web transactions of the first type are determinable based on expression patterns in HTTP message headers. A second expression pattern template, among the plurality of expression pattern templates and corresponding to a second type of web transaction, can indicate that statuses of web transactions of the second type are determinable based on expression patterns in HTTP message bodies.

A first expression pattern template among the plurality of expression pattern templates can be defined based on user input.

A template creator can be configured to provide an interface for the creation of expression pattern templates based on user inputs to the template creator.

Some implementations of the subject matter described herein include one or more computer-readable devices, which may be non-transitory, and which may have store instructions. When the instructions are executed by one or more computers, operations may be caused to be performed that include: intercepting, at an intermediary computing system, messages communicated between a web server system and one or more client computing devices; selecting a subset of the intercepted messages that are determined to commonly relate to a particular web transaction; identifying an expression pattern that occurs in the subset of the intercepted messages; determining that the identified expression pattern matches a first pre-defined expression pattern from among a plurality of different pre-defined expression patterns, wherein the plurality of pre-defined expression patterns respectively correspond to a plurality of different types of web transactions that are capable of being performed at least in part by the web server system, each of the plurality of pre-defined expression patterns indicating distinctive characteristics of messages that describe a particular status of the corresponding type of web transaction for the respective pre-defined expression pattern; determining a status of the particular web transaction based on the first pre-defined expression pattern that matches the identified expression pattern occurring in the subset of the intercepted messages; and storing information that indicates the determined status of the particular web transaction.

These and other implementations can optionally include one or more of the following features.

Storing the information that indicates the determined status of the particular web transaction can include creating an entry in a hierarchical transaction status log that indicates a hierarchical relationship among different types of transactions.

The operations can further comprise affecting a manner in which messages intercepted by the intermediary computing system are re-written by the intermediary computing system based on aggregated status information about the particular web transaction and other web transactions.

At least one of the plurality of constraints can be a timeout value that identifies a maximum time interval for the web server system to respond to a message from a client computing device requesting performance of the particular web transaction before the particular web transaction is assigned a pending transaction status.

The plurality of constraints in the first pre-defined expression pattern can be related to each other at least in part by Boolean logic operators Some implementations of the subject matter described herein include a computer-implemented method. The method can include intercepting, at an intermediary computing system, messages between a web server system and one or more client computing devices. A set of messages can be selected from the intercepted messages that are determined to relate to a single web transaction. An expression pattern can be identified that occurs in the set of messages. A determination can be made as to whether the identified expression pattern matches at least one pre-defined expression pattern from among a plurality of different pre-defined expression patterns, wherein each of the plurality of different pre-defined expression patterns corresponds to a different type of web transaction that is capable of being performed at least in part by the web server system. In response to determining that the identified expression pattern matches a particular pre-defined expression pattern, the set of messages can be associated with a particular type of web transaction that corresponds to the particular pre-defined expression pattern, and a status of the single web transaction can be identified using the identified expression pattern.

Some implementations of the subject matter described herein may realize one or more of the following advantages. Expression patterns may be defined that indicate distinctive characteristics of messages that correspond to a particular status of a given web transaction. The expression patterns may be associated with particular types of web transactions, so that results from multiple different transaction types can be monitored and analyzed, despite differences in the ways that statuses of different types of transactions are expressed. As such, transaction results may be accurately tracked by a computing intermediary or other proxy server using the expression patterns, without web applications being required to report their transaction results in any special manner. Flexibility in web application design can thus be maintained.

Moreover, by aggregating and analyzing the results of many transactions over a period of time, the operational health or status of web servers hosting a website may be measured. Appropriate taken may be taken to respond to events that affect the operational health or status of the web servers, such as adjusting the parameters of one or more security countermeasures applied to content served by the web servers.

BRIEF DESCRIPTION OF THE DRAWINGS

FIG. 2A is a table that depicts a set of example transactions of different types that are capable of being performed by servers for an example online banking website.

FIG. 2B is a table that depicts a set of example transactions of different types that are capable of being performed by servers for an example online photo sharing website.

Like reference numbers and labels among the figures indicate like elements.

DETAILED DESCRIPTION

This document generally describes systems, methods, devices and other techniques for improving the security of computer systems (e.g., host web servers and client devices), including by tracking the statuses of web transactions. In some implementations, an intermediary security system of one or more computers that is deployed as a full web proxy in front of a host web server is configured to track web transaction results from the host web server based on user-defined application parameters. The security intermediary may accept the definition of various types of transactions and result formats from system administrators who have full knowledge of the web server implementation, including the configuration of applications hosted by the web server to which users are allowed to submit requests to perform various online transactions. The transaction-type definitions may include expression patterns that indicate distinctive characteristics of content that pertains to a particular transaction type and that indicates a status of the transaction. With the flexibility of the transaction-type definitions and the expression patterns defined within the framework described herein, the security device may track a wide variety of web application transactions, regardless of how the status of any particular type of transaction is conveyed. Moreover, the security intermediary may utilize information about web transaction statuses that it detects to determine an operational status or health of the web server for which it is a proxy, to generate reports indicating information about the same, and to ensure that one or more parameters of other security techniques performed by the security intermediary and/or the web server are optimized.

Figure 1A:
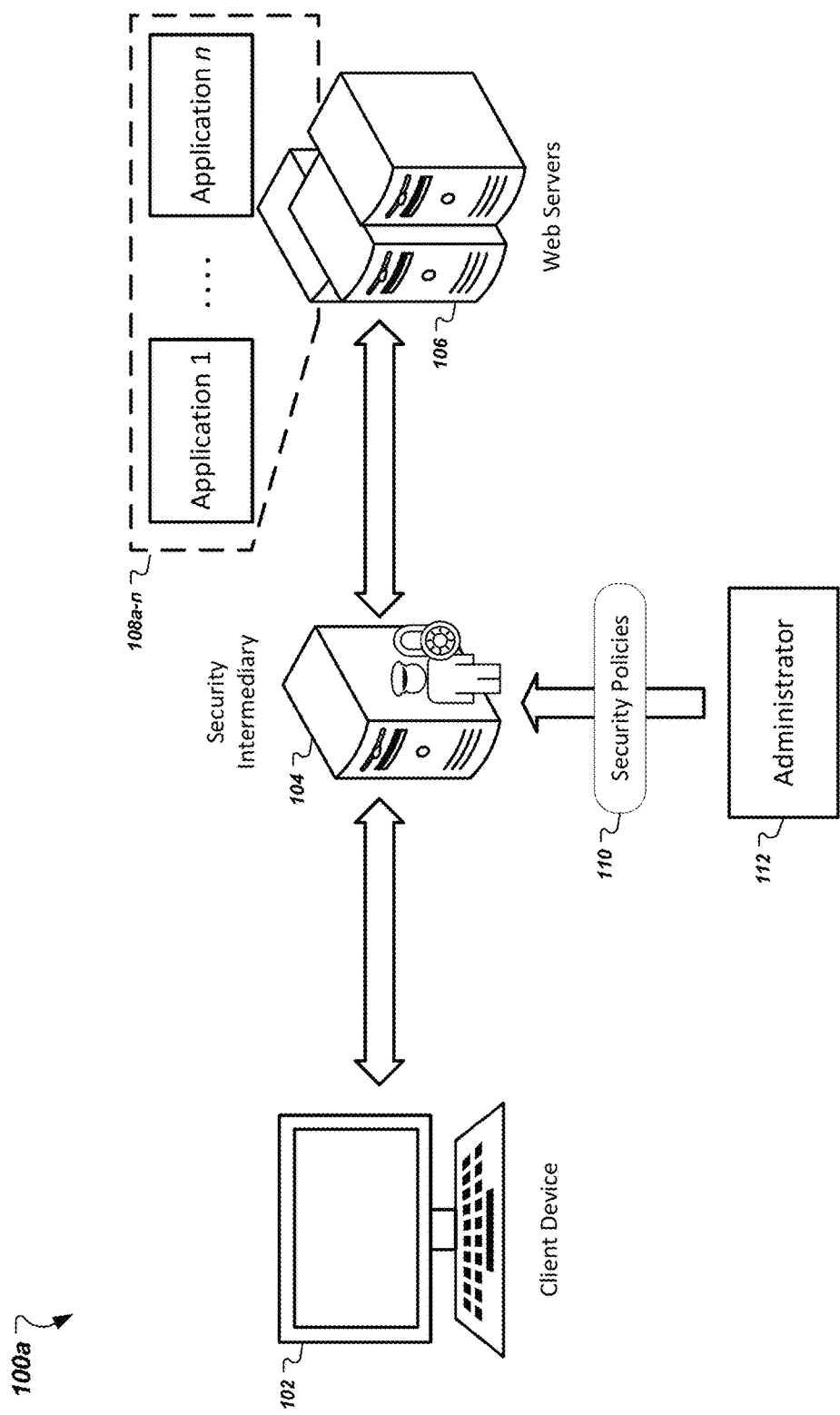
FIG. 1A depicts an example system for tracking online transaction results at a security intermediary as a proxy to a set of web servers.

Turning to FIG. 1A, a schematic diagram is shown of an example system 100a for tracking online transaction results. The system 100a can include one or more computers that are collectively configured as a security intermediary 104. The security intermediary 104 may be arranged in a communications network as a full proxy to one or more web servers 106. In some implementations, the security intermediary 104 may be arranged not as a full proxy, but as a reverse proxy. In either arrangement, the security intermediary 104 may intercept messages communicated between the web servers 106 and one or more client devices 102 (a single client device 102 is depicted in FIG. 1A). The security intermediary 104 may receive incoming messages from client devices 102 that are addressed to the web servers 106. The incoming messages may be processed, and the security intermediary 104 may determine whether a given incoming message should be provided to the web servers 106, or if the incoming message should be blocked from reaching the web servers 106. Incoming messages may also be modified as needed before being forwarded to the web servers 106.

Likewise, the security intermediary 104 may intercept outgoing messages from the web servers 106 that are intended to be delivered to a client device 102.

In some implementations, the security intermediary 104 may recode messages from an initial form as provided by the web servers 106, into a recoded form that is ultimately delivered to the client device 102. The re-coding may be performed according to one or more security countermeasures that are arranged to detect and/or deflect attempts by bots, malware, and other illegitimate actors from interacting with served content at the client device 102, and from exploiting the web servers 106 by carrying out illegitimate transactions from the served content.

In some implementations, the security intermediary 104 may be comprised of one or more computers that are physically separate and distinct from the client device 102 and the web servers 102. In some implementations, the security intermediary 104 may be implemented on a virtual machine, which may or may not reside on the same physical hardware as the web servers 106. In some implementations, the security intermediary 104 may be programmed as one or more modules of the web servers 106. The client device 102 and the web servers 106 may communicate over a wired or wireless network, such as the Internet, an intranet, or WI-FI. In some implementations, the security intermediary 104 may be located between the client device 102 and the web servers 106 on the Internet. The client device 102 may be any type of user device, for example, that is capable of communicating over a network such as the Internet, including a desktop computer, a notebook computer, a smartphone, a tablet computer, a smartwatch or other wearable devices.

The web servers 106 may host websites on one or more domains, and may be configured to serve content to the client device 102 automatically or upon request. In addition to static, pre-defined content, the web servers 106 may further include server-side scripts and other programs that provide dynamic content and services to end users. In some implementations, as shown in FIG. 1A, the web servers 106 may include one or more applications 108*a-n* that provide functionality to the sites hosted on the web servers 106. The applications 108*a-n* may each be programmed to perform transactions requested by a user at the client device 102. Some of the applications 108*a-n* may carry out unique types of transactions that are not carried out by any other of the applications 108*a-n*. For example, a first application may authenticate users with an account login transaction, but once a user has been authenticated he or she is granted access to the other applications without the other applications separately requiring account logins. Some of the applications 108*a-n* may carry out transactions that are also carried out by other ones of the applications 108*a-n*, although the manner in which the transactions are performed by different applications 108*a-n* may vary. For example, several of the applications 108*a-n* may allow a user to update his or her account profile, but the response pages indicating a result of the update account transactions may be implemented differently among the several applications.

The security intermediary 104 may accept security policies 110 that specify configuration data for how the security intermediary 104 is to process incoming messages from client devices 102 to the web servers 106, and outgoing messages from the web servers 106 to client devices 102. For example, the configuration data may include parameters that indicate a level of obfuscation that is to be applied in re-coding original content from the web servers 106 before the content is served to the client device 102.

In some implementations, the security policies 110 may include transaction-type definitions. The transaction-type definitions may specify expression patterns that are expected to occur in incoming and outgoing messages from the web servers 106, and that indicate statuses of different types of transactions capable of being performed by the web servers 106. For example, the definition for an account creation transaction for one of the applications 108*a-n* may include distinctive combinations of message body text and HTTP response codes in messages from web server 106 that indicate whether a request to create an account was successful, failed, or is pending. Similarly, the definitions for other types of transactions may include other expression patterns that respectively indicate the statuses of those types of transactions. In some implementations, the transaction-type definitions may map the results of all transaction types to a pre-defined set of statuses (e.g., success, failure, pending).

In some implementations, some types of transactions may have unique statuses or sub-statuses that do not also occur in other types of transactions. For example, an account creation transaction may have a sub-status "Failed Account Creation—Not All Required Fields Completed," which sub-status would not occur in an account logout transaction. The security intermediary 104 may then evaluate messages intercepted between the client device 102 and the web servers 106 with respect to the transaction type definitions. Messages that are determined to have expression patterns that match a pre-defined expression pattern specified in a transaction-type definition can be associated with a status for the particular transaction type of the matching pre-defined expression pattern. By way of example, the security intermediary 104 may receive a request from the client device 102 for the web servers 106 to initiate an account creation transaction. In response to the request, the web servers 106 may transmit a message having the HTTP body text "Failed Account Creation—Not All Required Fields Completed." Accessing the stored transaction-type definitions, the security intermediary 104 may determine that the response message includes body text matching the pre-defined expression pattern for a failed account creation transaction.

Accordingly, the security intermediary 104 may log the failed transaction and take other appropriate action where necessary (e.g., reporting the occurrence of a critical mass of failed transactions to the web servers 106, adjusting security parameters at the security intermediary 104, etc.).

In some implementations, the transaction-type definitions and other information contained in the security policies 110 may be specified by a system administrator 112. The administrator 112 may be a person, a computer application, or a combination of the two that has full knowledge of the particular implementation of the web servers 106, and the specific ways in which the applications 108*a-n* on the web servers 106 perform and report information about transactions requested to be performed by the client device 102. In some implementations, the transaction-type definitions and their expression patterns may be defined according to a flexible framework that allows the security intermediary 104 to recognize when a given message relates to a particular type of transaction, and to determine a status for the transaction, even across a wide range of possible message formats in which transaction results are indicated. The expression patterns may be manually defined by an administrator or may be derived automatically via analysis of code for a web site by an administrator application. In some implementations, expression patterns may be automatically determined by the security intermediary 104 using machine learning techniques and a model that analyzes differences among transaction-related messages for different transaction types.

Figure 1B:
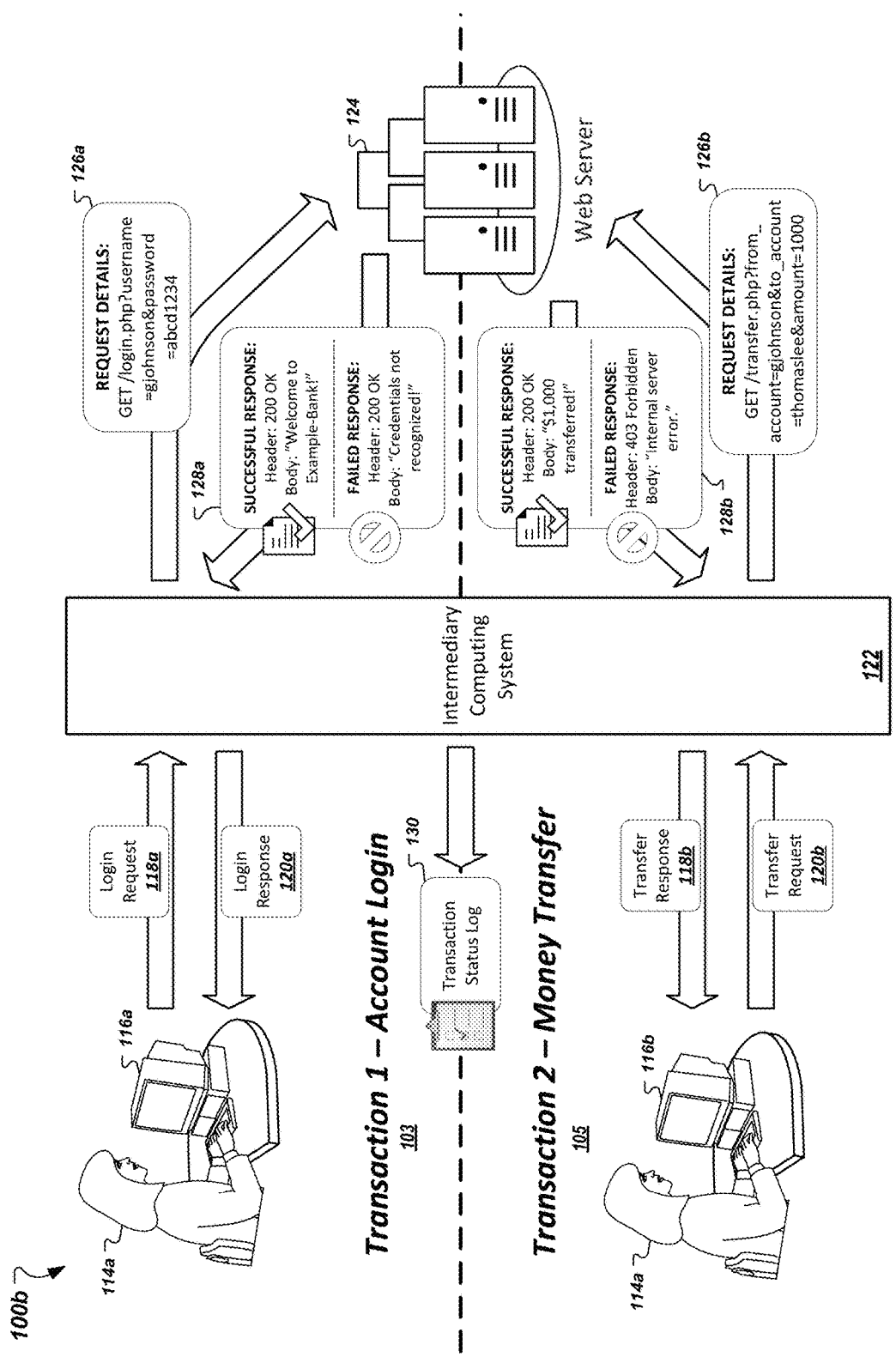
FIG. 1B depicts a schematic diagram of an example system for tracking online transaction results. The diagram further shows an example flow of data among client devices, web servers, and an intermediary computing system adjacent to the web servers (e.g., acting as a proxy to the web servers).

FIG. 1B depicts a schematic diagram of an example system 100*b* for tracking online transaction results. The example system 100*b* includes components like those in FIG. 1A, including client devices 116*a-b* (corresponding to client device 102), intermediary computing system 122 (corresponding to security intermediary 104), and web servers 124 (corresponding to web servers 106). The arrangement and configuration of the client devices 116*a-b*, intermediary computing system 122, and web servers 124 may be the same or similar to the corresponding arrangement and configuration of client device 102, security intermediary 104, and web servers 106 in FIG. 1A.

The schematic diagram of FIG. 1B illustrates the data flow of two example transactions 103, 105 as they occur between the client devices 116*a-b* and web servers 124. The figure reflects differences in HTTP messages generated by the web server 124 to indicate success and failure of each transaction 103, 105. The intermediary computing system 122 uses pre-defined expression patterns from stored transaction-type definitions to resolve the differences and to track the statuses of each transaction 103, 105 in a transactions log 130. Each of the transactions 103, 105 are typical transactions that may occur at an online banking website, for example. In particular, transaction 1 (103) represents an account login transaction, and transaction 2 (105) represents a money transfer transaction for wiring money among different accounts.

Starting with the account login transaction 1 (103), a user 114a at client device 116a initiates a request to login to her online banking account at her bank's website or through a locally-installed banking application, for example. The login request 118a is intended for the bank's web servers 124. However, the bank's servers 124 are protected by the intermediary computing system 122, which is arranged as a proxy server to the host servers 124. As a result of the proxy arrangement, the login request 118a is communicated over the Internet and is first directed to the intermediary computing system 122, rather than the host web servers 124.

The intermediary computing system 122 may analyze the login request 118a message, and determines how to handle the request. For example, if the intermediary 122 determines that the request 118a is a valid request (e.g., not the result of a malware initiated request), then it may forward the request 118a to the host web servers 124. In the example of FIG. 1B, the login request 118a is in the form of an HTTP GET request that calls an application script login.php with user-entered credentials for username and password, as shown in the request details 126a. Upon receiving the request 118a, which may or may not have been modified by the intermediary 122, the web server 124 generates a responsive message 128a. The responsive message 128 may indicate a result or other status of the requested login transaction 103.

In some implementations, the status of the transaction 103 may be indicated in an application-specific manner. For example, the responsive message 128 for the login transaction 1 (103) may indicate two possible results: (i) success for when the user's credentials are accepted and the user 114a is granted access to her account on the banking website, and (ii) failure for when a problem was encountered such that the user 114 is not granted access to her account. A successful response may be indicated by text in the body of the message "Welcome to Example-Bank!," which may be printed at the top of a landing page when the user 114a logs into her account, for example. In contrast, a failed response may be indicated by text in the body message stating "Credentials not recognized!" Note that for both successful and failed login attempts, the HTTP response code in the header of the responsive message 128 is "200 OK". As such, to track the status of the login transaction 103, the intermediary computing system 122 may access a transaction-type definition for the account login transaction 103, and may evaluate the responsive message 128 with respect to one or more expression patterns contained in the definition. The transaction-type definition may indicate that the occurrence of the string "Welcome to Example-Bank!" in the body of the responsive message 128 identifies a successful login transaction, whereas the occurrence of the sting "Credentials not recognized!" indicates a failed login transaction. Because the header response code 200 OK is equivalent among both successful and failed login transaction messages, it is generally not relevant to discerning the status of a login transaction. Accordingly, expressions from the responsive message's 128a header response code may be omitted from the expression patterns in the transaction-type definition for the login account transaction 103.

Although not shown in FIG. 1B, in some implementations, a given status (e.g., successful login, failed login, or pending login) for a transaction may be determined based not just on the occurrence of a single expression in the responsive message 128a, but on a combination of multiple expressions in the responsive message 128a and/or on different possible combinations of one or more expressions in the responsive message 128a. For example, if the user 114a submitted in the request 118a previously valid credentials that have now expired, the responsive message 128a may reflect this condition with the string "Credentials no longer valid. Click Here to Reset Password." Because either of the preceding string and the "Credentials not recognized!" string may indicate a failed transaction (depending on the cause of the failure), the transaction-type definition for the account login transaction 103 may specify that the occurrence of either string in the responsive message 128a indicates a failed transaction status. In some implementations, the intermediary computing system 122 may also keep track of transaction statuses at a more granular level. For example, failed transactions for non-recognized credentials may be tracked separately from failed transactions for expired credentials or for server technical defects.

The intermediary computing system 122 may also maintain a hierarchical log 130 of transaction statuses in which transactions are classified into sub-statuses, which are grouped into one or more higher-levels of statuses—where each lower level adds detail to the higher levels. For example, failed transactions for non-recognized credentials may be tracked separately from failed transactions for expired credentials or for server technical defects, but each of these species of failed transactions may also be grouped as relating more generally to a failed transactions class, without regard for the particular cause of the transaction failure. In some implementations, the occurrence of multiple expressions from distinct portions of the responsive message 128a, or from multiple different messages relating to a given transaction (e.g., from both the request 118a and from the responsive message 128a), may be required in combination to determine the status of a given transaction. For example, some transactions may require multiple rounds of communications between the client device 116a and host web servers 124 to perform a single transaction. The intermediary computing system 122 may correlate the messages related to the single transaction, and may evaluate their content for the occurrence of expression patterns across multiple messages as indicated by the transaction-type definition to determine a transaction status.

Once the user 114a has logged into her online banking account, she initiates a second transaction 105 to transfer a sum of money between two financial accounts, as illustrated by the second transaction 105 in FIG. 1B. The transfer request 120b, like the login request 118a, is routed through the intermediary computing system 122, and to the host web servers 124 for the banking site. As shown in the request details box 126b, the parameters for the transfer funds request 120b are different than the parameters for the login request, as each of the transactions 103, 105 have a different application programming interface (API). For example, the login request 118a included parameters for authenticating the user 114a, whereas the transfer funds request 120b includes parameters that identifies the origin and destination accounts for the funds transfer, and an amount that is to be transferred. In some implementations, the parameters of the request may be encrypted, although they are shown in plaintext in the figure for illustration. In response to receiving the request 120b, the web server 124 attempts to perform the transaction.

Depending on a result of the transaction, the web server 124 generates and serves a responsive message 128b that indicates the result of the transaction. If the transaction was performed successfully, then the responsive message may be an HTML page having the header response code "200 OK" and body text "$1,000 transferred!" The expression pattern in a transaction-type definition may be variable depending on parameters of the transaction. For example, the body text of responsive message 128a for a successful transfer of funds includes the amount of the transaction ($1,000 in the illustrated example). The intermediary 122 may determine that the responsive message is valid if the amount stated in the responsive message 128b matches the amount specified in the request 120b. In some implementations, the intermediary 122 does not verify the precise value of the transaction, but simply looks for the expression "$Value transferred!" to determine whether the funds transfer transaction 105 was successful, where "$Value" is a wildcard of the expression pattern specified in the transaction-type definition.

The expression pattern that indicates a failed funds transfer transaction is different than the expression pattern that indicates a successful result. For a failed transaction, the responsive message 128b includes the HTTP response code "403 Forbidden," and includes the body text "Internal server error." This may be the default message of the host servers 124, for example, when an internal error has occurred and a custom error page has not been specified to take its place. Unlike the login transaction 103, the header values for the funds transfer transactions are sufficient to distinguish successful transactions (header value=200 OK) from failed transactions (header value=403 forbidden). Therefore, this distinction may form the basis for an expression pattern, in the transaction-type definition for the funds transfer transaction 105, that refers to the header values of the responsive message 128b as indicating the status of a given transaction. The body text also differentiates successful and failed transactions in this example, and so it too may form the basis for a transaction-specific expression pattern that indicates transaction status in addition or alternatively to the HTTP header values. Identification of such patterns may be made at very discrete levels (e.g., for every page) by a developer of a web site, or at a very general level such as by identifying default information that popular web development platforms provide for their users for such transaction types.

Upon receiving the responsive message 128b, the intermediary computing system 122 applies the corresponding transaction-type definition to the message 128b to determine a status (e.g., successful, failed, pending) of the funds transfer transaction 105. The responsive message 128b is then forwarded to the client device 116b, as illustrated in the dataflow by the box showing transfer response 118b. The intermediary computing system 122 may cause information to be stored about the transaction locally at the intermediary 122 itself, or at a remote computing system (not shown). For example, the intermediary 122 may maintain a transactions status log 130. An entry may be added to the transactions status log 130 that includes various information about the transaction 105, such as the transaction type, a timestamp indicating a date/time at which the transaction 105 occurred, and the result or other status of the transaction 105.

In some implementations, the intermediary may maintain one or more counters that indicate a number of occurrences of transactions occurred over a period of time. A respective counter may be maintained, in some implementations, for each type of transaction detected at the intermediary 122. In some implementations, respective counters may be maintained for each status of transactions detected by the intermediary 122. For example, separate counts may be maintained that indicate numbers of successful account login transactions, failed account login transactions, successful funds transfer transactions, and failed funds transfer transactions.

The counts from one or more of the counters may be combined by the intermediary 122 to analyze an operational status or health of the web server 124. For example, a sum of all successful and all failed transactions across multiple transaction types may be determined from time to time. The web server 124 or a system administrator may then be alerted, for example, if the volume of unsuccessful transactions detected is disproportionately high (e.g., greater than a threshold value). In some implementations, the intermediary 122 may evaluate the effectiveness of security countermeasures that it applies to content served from the web server 124 to client devices based on the tracked data regarding transaction statuses. For example, if the volume of unsuccessful transactions (e.g., the absolute number of unsuccessful transactions, a percentage change in the number of unsuccessful transactions over a period of time, or a ratio of unsuccessful transactions to successful transactions over a period of time) exceeds a threshold volume over a period of time, the intermediary computing system 122 may adjust the security countermeasures that it applies to content served from the web server 124. In some implementations, additional security countermeasures may be applied, or the parameters of existing countermeasures may be adjusted so as to increase a degree of obfuscation of the original content that results from the intermediary's re-coding of the content. In some implementations, all or some countermeasures may be suspended in response to the volume of unsuccessful transactions exceeding the threshold, such as when the countermeasures are determined to be a possible cause of the unsuccessful transactions. In some implementations, these adjustments to the countermeasures applied by the intermediary 122 to served content may be made in a like manner when the volume of unsuccessful transactions is determined to fall below a minimum expected level, or when the volume of successful transactions rises above a threshold volume.

Referring now to FIGS. 2A and 2B, tables 200a-b are shown of example sets of transactions that may be carried out at a banking website and at a photo sharing website, respectively. The applications that perform the respective transactions at the banking and photo sharing websites may be implemented differently from each other, and therefore the APIs for initiating the transactions and the respective messages that indicate results or other statuses of the transactions may also be application-specific and/or transaction-type specific. In some implementations, separate transaction-type definitions may be provided for each of the transaction types 202-212. These definitions may specify unique expression patterns of messages related to each of the transaction types 202-212, to allow a security intermediary or other computing system to track transaction statuses across a wide range of transaction types. The expression patterns may reflect differences in the APIs among the various transaction types 202-212.

For example, table 200a shows three types of transactions 202-206 that may be carried out at an online banking website, namely a 'login' transaction 202, a 'create account' transaction 204, and a 'money transfer' transaction 206. Each of the transactions has a respective API that indicates how a request is made to initiate the transaction, the format of a response message indicating a successfully performed transaction, and the format of a response message indicating a failed transaction.

Differences among the formats of requests, successful responses, and failed responses may be exploited to determine transaction-type definitions that uniquely indicate how each available status for each type of transaction 202-206 may be determined. For example, the money transfer transaction 206 utilizes different HTTP response codes (header values) to differentiate successful responses from failed responses. An expression pattern in a transaction-type definition for the money transfer transaction 206 may therefore refer to the "200 OK" response code as indicating a successful transaction, and may refer to the "404 Forbidden" response code as indicating a failed transaction. In contrast, neither the 'login' transaction type 202 nor the 'create account' transaction type 204 may utilize the HTTP header response codes to differentiate successful and failed responses, because the same response code (200 OK) is used for in each case for both types of transactions. Instead, the expression patterns specified in the transaction-type definitions for these transactions 202, 204 may reflect differences in the HTTP body text to distinguish successful and failed transactions (and to distinguish other statuses when applicable).

Table 200b in FIG. 2B shows three types of transactions 208-212 that may be carried out at an online banking website, including a 'login' transaction 1 (208), a 'create account' transaction 2 (210), and a 'share photo' transaction 3 (212). The photo sharing website thus includes a pair of transaction types 208, 210 analogous to the login and create account transaction types 202, 204 depicted in FIG. 2A for the banking website. However, the APIs for the login and create account transaction types 208, 210 for the photo site are not the same as the APIs for the login and create account transaction types 202, 204 for the banking site. For example, response codes for these transactions at the photo sharing website are usable to distinguish successful login and create account transactions from failed login and create account transactions, whereas the response codes were not so usable for these corresponding transactions at the banking website. Therefore, the transaction-type definitions for like transactions at the photo sharing website and the banking website may be different from each other as a result of the specific implementations of the transactions at the respective sites. In some implementations, the transaction-type definitions may be manually defined by an administrator or other user who has knowledge of the specific implementations of the transactions at the respective sites. In some implementations, the transaction-type definitions may be automatically determined (e.g., by machine-learning techniques trained on prior served resources and associated transaction-type definitions that were made manually) based on analysis of messages relating to the various transactions 202-212 at each of the websites. The output of the automated analysis may be a neural network or other classifier or model that defines a set of rules for classifying detected transactions according to their proper statuses.

Figure 3A:
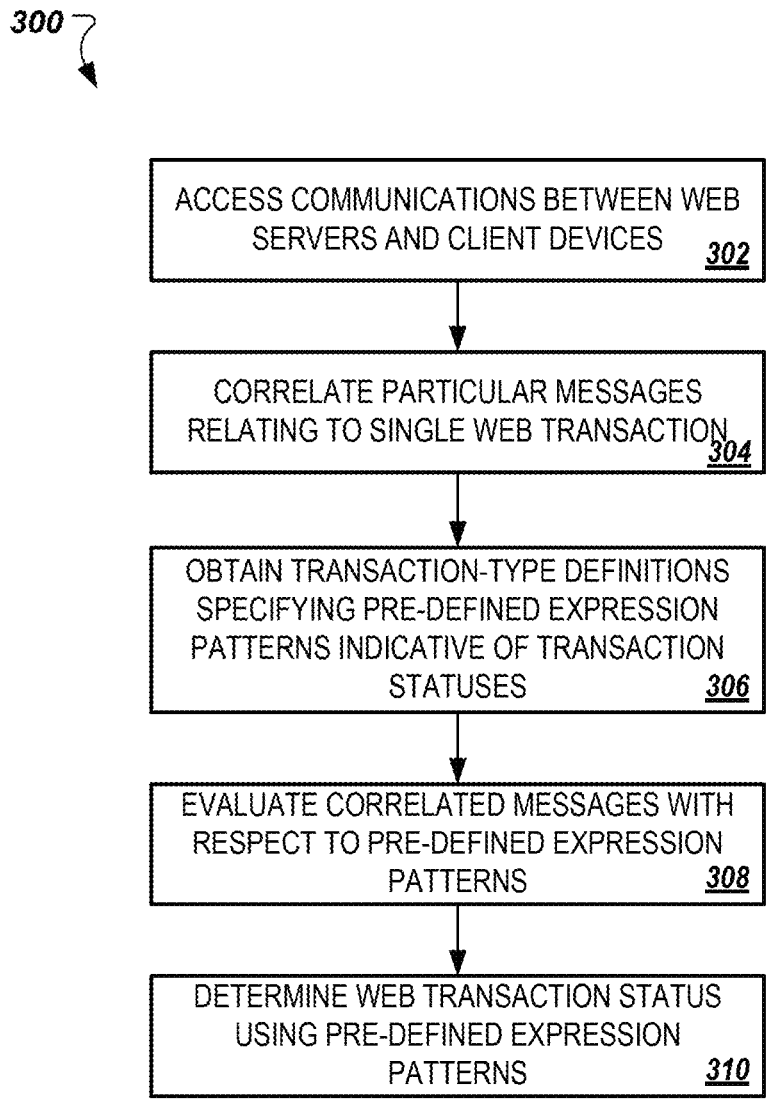
FIGS. 3A and 3B depict a flowchart of an example process for monitoring the results of multiple types of transactions that occur at a website over a period of time, and for taking appropriate action based on an analysis of the transaction results.
Figure 3B:
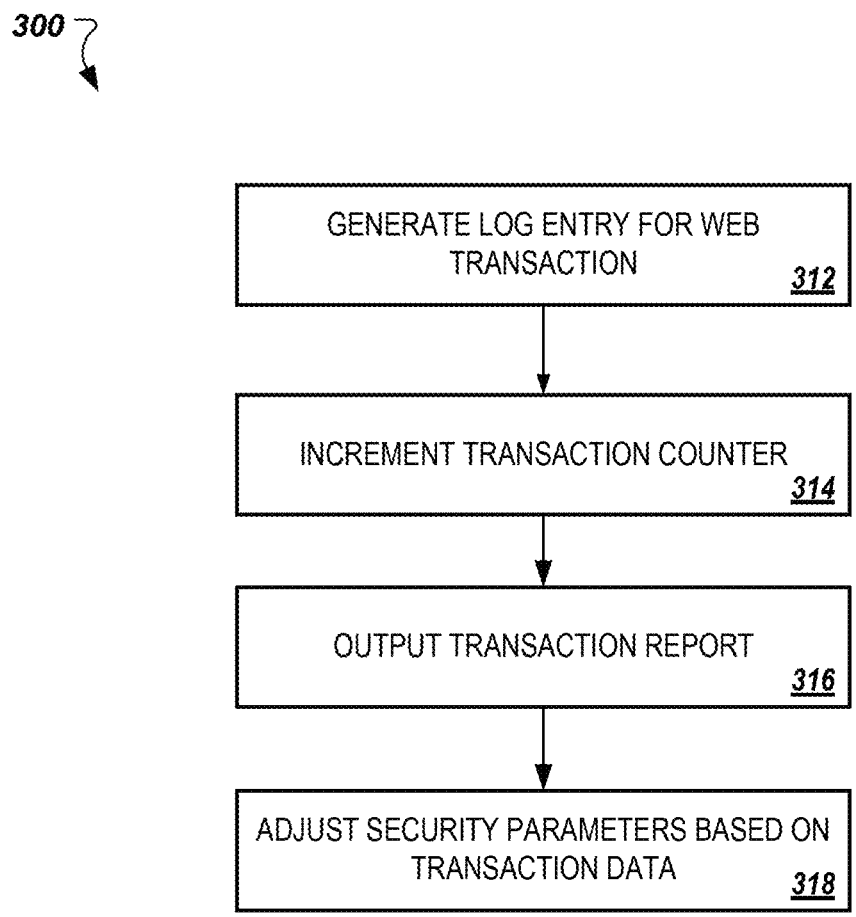
Figure 5:
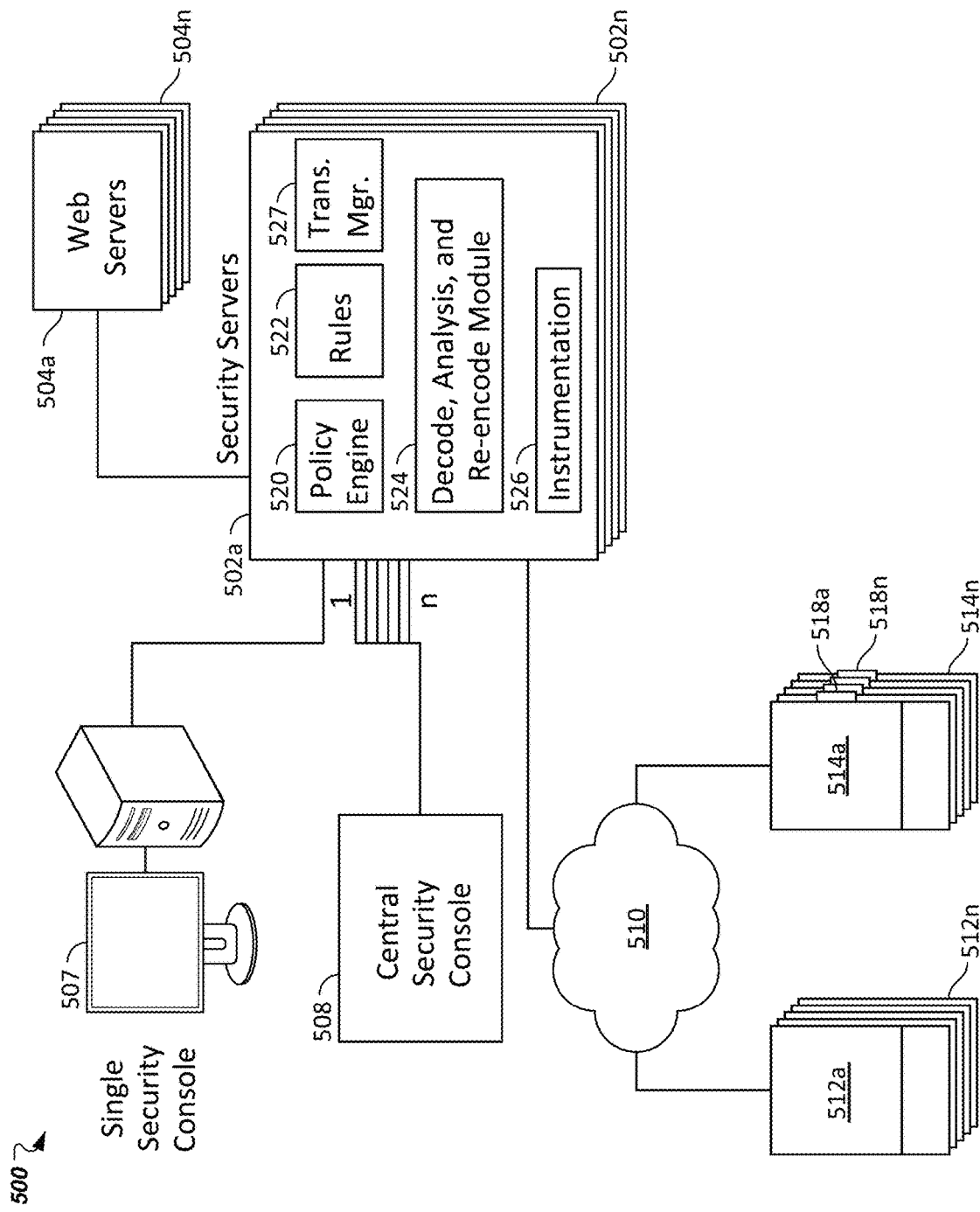
FIG. 5 depicts an example system for serving polymorphic and instrumented code.

Turning to FIGS. 3A and 3B, a flowchart is shown of an example process 300 for tracking online transactions that have transaction-specific parameters indicating the results or other statuses of transactions. Information determined from tracking many transactions over a period of time may be used, in some implementations, to assess the operational health of a web server; to determine the efficacy of security countermeasures applied to content served by a web server; to inform whether and how to adjust security countermeasures being applied to served content; to generate reports describing a web server's performance over a period of time as indicated by online transaction results; and to detect in real-time possible botnet or other illicit activity that may cause a rise in failed transactions at a web server. In some implementations, the process may be carried out by the various systems and devices described throughout this document, including in whole or in part by security intermediary 104 (FIG. 1A), intermediary computing system 122 (FIG. 1B), security intermediary 406, and security servers 502a-n (FIG. 5). Generally, the process 300 may be performed at least in part by an intermediary computing system arranged as a proxy between client devices and one or more web servers. As a proxy server, the intermediary may intercept communications between the web server and client devices, so as to isolate the web server from certain security risks, and to better manage a load delivered to one or more computers of the web server.

In some implementations, the process 300 begins at stage 302, when the intermediary (or other computing system) accesses communications between one or more web servers and one or more client computing devices. In some implementations, the communications are accessed in real-time as incoming and outgoing messages going to and from the host web server are routed through the intermediary before they are served to their ultimate destination (e.g., before outgoing messages are delivered to the client computing devices or before incoming messages are delivered to the host web servers). In some implementations, however, the process 300 may be performed offline, and the communications may be obtained from records of stored communications that have previously occurred.

The communications may generally be in the form of messages transmitted between the client devices and web server. For example, the communications may include HTTP requests (e.g., GET and POST requests) from client devices to initiate transactions at the web server, and responsive messages transmitted by the web server to the client devices in response to the requests. In some implementations, a transaction result or status may be the primary information conveyed by a responsive message, such as where the message body includes little information but the status or result. HTTP response codes may be likewise be used to indicate the result or status of a requested transaction. In some implementations, the responsive message may include substantially more information than just an indication of the result or status of a requested transaction. For example, when a user successfully logs into an account at a website, the website may direct the user to an account homepage that includes a plethora of information that the user may be seeking. The responsive page may be an HTML page, and may have include or reference additional content including style sheets (e.g., Cascading Style Sheets), JavaScript code, images, and other media files that are collectively used at the client device executing the responsive page to generate a complete presentation of the page for the user.

At stage 304, a particular transaction is identified for analysis, and all or a portion of the accessed messages that relate to the particular transaction are determined. These messages may be correlated with each other due to their common relationship to the particular transaction. Generally, all of the messages that are required to analyze the particular transaction and determine a result or other status of the transaction are identified at this stage 304. The number and composition of messages that one needs in order to determine a result or status may vary for different types of transactions. A single message generated by the web server in response to a request may be sufficient to determine a result or status for some types of transactions.

But other transactions may require information from multiple messages to definitively determine a result or status of the transaction, such as where expressions occur in both the request message and the responsive message that are useful for determining the status or result of a transaction. For example, the responsive message for a particular type of transaction may include little information other than a response code (e.g., '200 OK' or '403 Forbidden' or '404 Not Found'), in which case the corresponding request message that prompted the responsive message may also be identified to determine which transaction the responsive message pertains to.

In some situations, a client device may initiate multiple attempts to perform a transaction, each of which is unsuccessful until the final attempt. The intermediary may thus correlate the messages from each of the multiple attempts within a single session from the client computer. Information may be tracked and stored about the number of attempts that were required until the transaction was successfully performed, for example. In some implementations, a particular transaction may be identified, and related messages correlated at an intermediary computing system in real-time. For example, the intermediary may receive a first message from a client device that requests to login to an account at the host web server located behind the intermediary. The intermediary may parse the message and determine that it relates to an account login transaction, and may cache information about the request in anticipation of receiving a corresponding responsive message from the web server. The intermediary passes the request message to the host web server, and the host web server may attempt to perform the transaction. Depending on a result of the attempt, the host web server may generate a responsive message, which is routed to the intermediary before being served to the client device that initiated the request. The intermediary may then use information in the responsive message to correlate it with the cached request information. Accordingly, multiple messages that relate to a particular transaction may be tracked by the security intermediary.

At stage 306, transaction-type definitions for one or more types of transactions are accessed for use in evaluating the result or other status of the web transaction corresponding to the set of messages identified at stage 304. The definitions may serve, in effect, as fingerprints for each respective transaction type. In some implementations, the transaction-type definitions may be configuration files that are stored at the intermediary computing system, or that are otherwise accessible to the intermediary computing system (e.g., remotely stored). A respective transaction-type definition may be provided for each distinct transaction type that the intermediary is tasked with tracking, in some implementations.

Each transaction-type definition generally includes information about the specific manner in which the corresponding transaction type is implemented at the host servers. For example, the transaction-type definition for a transfer funds transaction at a banking website may indicate the protocol in terms of how many and what messages are transmitted between a client device and the bank's host servers in order to perform a single transfer of funds transaction. The definition may also include the format of the messages and the expected parameters that may be included in request messages for initiating the transaction, in messages generated by the host server in response to the request, and in other messages. Moreover, the definition may include, for each candidate result or status of the transaction (e.g., each result or other status that can possibly occur for the transaction type), a pre-defined expression pattern that indicates distinctive characteristics (e.g., expressions) occurring in one or more messages relating to the transaction that uniquely identifies the candidate result or status of the transaction, and that differentiates messages for the candidate result or status from messages for other candidate results or statuses. Such distinctive characteristics and expressions that may occur in message relating to a particular transaction may include binary values, text strings, and other regular expression patterns. The expressions may occur in any one or more distinct portions of a message (e.g., header and body), and may occur in a single message or across multiple distinct messages relating to a transaction. Other distinctive characteristics may relate to the particular request method used (e.g., GET or POST), and characteristics of the URI of a request or other message. Some examples of individual matching criteria (i.e., distinctive characteristics and expressions) that may be indicated by an expression pattern in a transaction-type definition include:

Request method is GET
Host header matches regular expression ".*www\.example-bank\.com.*"
URI matches regular expression ".*login.*"
Response code is 200
Response body contains text "Welcome"
Response body matches regular expression ".*created.*"

In some implementations, the expression patterns in the transaction-type definitions may combine multiple individual matching criteria to form an advanced matchf or more flexible tracking of transaction results or other statuses. The expressions may use Boolean logic, for example, to specify the combination(s) of expressions and other characteristics occurring in messages that indicate a match to a candidate result or status of the transaction. For example, six individual matching criteria may be specified for a given transaction type: match-A, match-B, match-C, match-D, match-E, match-F. These individual criteria (e.g., distinctive characteristics and expressions) can be used together to form the following Boolean expression pattern. A match to a particular candidate result or status of the transaction is only determined to occur when the Boolean expression result is 'true':

match-A AND (match-B OR match-C) AND (match-D OR (match-E AND match-F))

With the Boolean expression match supporting more flexible transaction-type definitions, the security intermediary can thereby track transaction statuses at a more granular level. For example, the intermediary may track and record failure reasons based on the HTTP response code and body text, such as:

Login transaction failure due to server error, if
    HTTP response code is 302; AND
    HTTP body text matches ".*Internal server errors.*".
Login transaction failure due to incorrect credentials, if
    HTTP response code is 200; AND
    HTTP body text matches ".*incorrect username or password.*".

In some implementations, the expression patterns in transaction-type definitions, including the individual matching criteria and the Boolean logic for advanced matching, may be wholly or partially user-defined. For example, a system administrator who has knowledge of the specific implementations of the various transactions that a web server is capable of performing (or at least of the transactions that are to be tracked) may manually specify expression patterns for the various transactions. In some implementations, an administrator may type the expression patterns into a configuration file in a format that is capable of being understood by the intermediary or other computing system charged with tracking transaction results or statuses. In some implementations, a graphical interface may be provided that allows the administrator to define expression patterns according to one or more templates. For example, the graphical interface may include input fields and menus that are selectable by the administrator to choose a particular transaction type (or multiple transaction types) to which the expression pattern applies. The interface may further allow the administrator to identify which result or other status of the selected transaction type is applicable to the expression pattern. Fields and other menus may also be populated automatically or based on user input to specify the individual matching criteria and Boolean logic (if any) that comprise the expression pattern being created. In some implementations, the interface for creating expression patterns may be accessed by the administrator at a console at the intermediary computing system, at the web servers, or both. In some implementations, a web-based portal may be provided that includes the interface, so that the administrator may remotely create, modify, and delete expression patterns from any convenient location with a networked device that can access the portal.

In some implementations, expression patterns for the transaction-type definitions may be automatically learned based on examples of previously communicated messages from a set of transactions. A model, such as a neural network, may be used to classify messages (or sets of related messages) according to the results or statuses of the transactions indicated by the messages. For example, a set of training data may be curated that includes messages that relate to particular transactions in the set of transactions. Each message in the training set may be labeled so as to identify a type of the transaction to which the message relates, and the status or result of the transaction. The model may then be trained using supervised machine-learning techniques. The parameters of the model may indicate distinctive characteristics of messages that allow the model to determine likelihoods that the messages indicate each of the candidate statuses (e.g., results), and to determine the most likely candidate statuses of the corresponding transactions indicated by the messages.

At stage 308, the messages identified at stage 304 that relate to a particular transaction are evaluated with respect to the pre-defined expression patterns included in one or more transaction-type definitions. The expression patterns from a transaction-type definition can be compared to expressions and other characteristics of the identified messages for the transaction. If a match is determined to exist between the messages and one of the expression patterns, then a hit may be recorded for the result or status that corresponds to the matched expression pattern. For example, if the Boolean expression pattern evaluates as true with respect to a combination of expressions and other distinctive characteristics in a set of messages, then the intermediary may mark the set of messages relating to a successful transaction, a failed transaction, or a transaction that has some other status corresponding to the matched expression pattern.

In some implementations, the intermediary or other computing system performing the process 300 may pre-determine, based on content or other characteristics of the identified messages, the type of transaction relating to the identified set of messages. As such, the messages may be evaluated only with respect to the expression patterns in the particular transaction-type definition that corresponds to the pre-determined transaction type. In other implementations, however, the transaction type indicated by a set of messages may not be pre-determined, in which case the messages may be evaluated with respect to the expression patterns contained in multiple different transaction-type definitions until a match is determined or until it is determined that no match exists to expression patterns in any of the available transaction-type definitions. At stage 310, the status of the transaction indicated by the set of messages is determined based on a result of the evaluation at stage 308, as has been described.

Stages 312-318 of the process 300 indicate various actions that may be taken based on information determined from tracking transactions over a period of time. These actions may be taken, in some implementations, to improve the operation and security of one or more computing systems. For example, a rise in the number of failed transactions over a period of time may indicate that there is a defect at the host web servers for a site, that the host web servers are overloaded and unable to handle the volume of requests being made of the servers, and/or that an attack has occurred or is underway (e.g., a DDoS attack). Generally, these actions have been described elsewhere in this document as well, including with respect to FIGS. 1A and 1B. Additional examples are described below.

At stage 312, a log entry can be created for a transaction for which a status has been determined. The log entry may include various information about the transaction and the circumstances of the transaction. In some implementations, the data captured in the log may be configurable so that the fields for which data is collected are customized to an administrator's requirements. The fields may include transaction type, status, host site, and a timestamp. One example is as follows:

Entry 1|Tue Mar 24 21:50:30 PDT 2015|
www.example-bank.com|Login|Request
Entry 2|Tue Mar 24 21:50:36 PDT 2015|
www.example-bank.com|Login|Success
Entry 3|Tue Mar 24 21:50:39 PDT 2015|
www.example-bank.com|Login|Request
Entry 4|Tue Mar 24 21:51:01 PDT 2015|
www.example-bank.com|Login|Failure_Incorrect_Password
Entry 5|Tue Mar 24 21:52:35 PDT 2015|
www.example-bank.com|Transfer|Request
Entry 6|Tue Mar 24 21:53:15 PDT 2015|
www.example-bank.com|Account Create|Request
Entry 7|Tue Mar 24 21:54:12 PDT 2015|
www.example-bank.com|Account Create|Failure At stage 314, a transaction counter can be incremented that indicates a number of transactions detected over a period of time as having a particular status. The transaction counters may be provided in-memory on a security intermediary, in some implementations, thereby allowing for convenient access to aggregated transaction status information. For example, a snapshot of counts at an online banking website may indicate that a number of login successes is 34,246; a number of login failures due to incorrect password is 10,123; a number of login failures due to server error is 542; a
number of logins pending (i.e., requests with no responses yet received) is 28; a number of successful account creations is 523; a number of failed account creations due to attempts to register an existing username is 19, etc.

At stage 316, the process 300 outputs a report or alert based on information about tracked transaction statuses. For example, the log and aggregate counts may be periodically pushed (e.g., e-mailed) to subscribers, such as a system administrator. Moreover, the intermediary may asynchronously generate notifications to alert administrators, other users, and/or the host web servers when abnormal events have been detected. The abnormal events may include a volume of unsuccessful web transactions that exceeds a threshold volume over a period of time, a rate of increase in unsuccessful web transactions that exceeds a threshold rate of increase over a period of time, a volume of pending transactions that exceeds a threshold volume over a period of time, a rate of increase in unsuccessful transactions that exceeds a threshold rate of increase over a period of time, or a combination of these.

In some implementations, where a security intermediary is arranged as a proxy to one or more host web servers and where the intermediary is configured to apply security countermeasures to messages transmitted between the web servers and client devices, the operating parameters of the intermediary may be adjusted based on information about tracked transaction statuses (stage 318). The information about transaction statuses can provide feedback to the security intermediary to determine the efficacy of the countermeasures, and to adjust a manner in which the countermeasures are applied.

In some implementations, the countermeasures involve the re-coding, by the security intermediary, of content served from the host servers from an initial form to an obfuscated form, so as to interfere with an ability of malware, bots, and the like, to initiate fraudulent transactions from the served content, or to otherwise exploit users' sensitive information and the host servers using the served content. The intermediary may recode content differently each time it is served, in some implementations, by applying random transformations to the content. In this way, a moving target is created that makes it difficult for illicit actors to predict how content will be recoded in any given instance based on analysis of previously served and recoded content. The re-coding may also be performed in a manner that substantially preserves the look and feel of the content when it is executed and presented at the client device, so that the user is generally unaware that the content has been recoded. For example, text may be converted to images, function and attribute values in HTML code may be changed, class names may be changed in CSS code, and the parameters of JavaScript code may be changed in a coordinated fashion that does not "break" the functionality or visual appearance of a webpage being served. Generally, the intermediary may apply re-coding techniques like those performed by the security servers 502a-n, and by the decode, analysis, and re-encode module 524 (FIG. 5) of the servers 502a-n. However, the manner in which content is recoded according to the applied countermeasures may be determined at least in part by information about transaction statuses over a period of time. For example, when the tracked transaction statuses indicate the occurrence of an abnormal event, the intermediary may, in some implementations, apply additional countermeasures or further obfuscation to affect a higher level of security. When the abnormal event has passed, the intermediary may then revert to less computationally expensive obfuscation techniques for a relatively lower level of security, for example.

In some implementations, the countermeasures or other security parameters applied by a security device (e.g., intermediary) may be adjusted based on an analysis of transactions over a period of time, or over multiple different periods of time. The security device may change the parameters for a security countermeasure (or determine whether to activate or deactivate application of a security countermeasure) based on tracked transaction statuses for one or multiple types of transactions. For example, security countermeasure A may be activated in response to identifying that a number or frequency of failed transactions of a first type exceeded a first threshold failure rate over a period of time. If, after activating countermeasure A and applying it for a period of time, the security device identifies that the number or frequency of failed transactions falls below the first threshold failure rate (or a different threshold failure rate), then the device may respond by de-activating countermeasure A, or by adjusting its parameters to relax the security features of countermeasure A, for example.

Different events may trigger different responses by the security device. For example, an increase in the failure rate of a first type of transaction may trigger activation of countermeasure A, whereas an increase in the failure rate of a second type of transaction may trigger activation of countermeasure B. In some cases, triggering events may be defined based on a selected combination of transaction types. For example, an increase in the failure rates of both a first and second selected types of transactions may be required to activate countermeasure C. Generally, the security device may provide an interface that allows users to manually define triggering events in a flexible manner. The manual definitions may use Boolean logic, for example, to define triggering events and to express how the security device should respond to each of the defined triggering events. The definitions may be set forth in a configuration file that is used by the security device to determine operating parameters. For example, a configuration file may include a first definition that calls for the security device to adjust the parameters of countermeasure A in response to identifying that 1) a failure rate of transaction-type 1 over a period of time exceeds a first threshold AND 2) the failure rate of transaction-type 2 did not decrease by a threshold amount over the period of time OR 3) the failure rate of transaction-type 3 increased by at least a threshold rate of increase over the same period of time or another period of time. Generally, the security device (e.g., an intermediary) can thus affect a manner in which messages intercepted by the intermediary computing system are re-written (e.g., by applying or adjusting parameters of different security countermeasures) based on aggregated status information from web transactions of one or more types.

Figure 4:
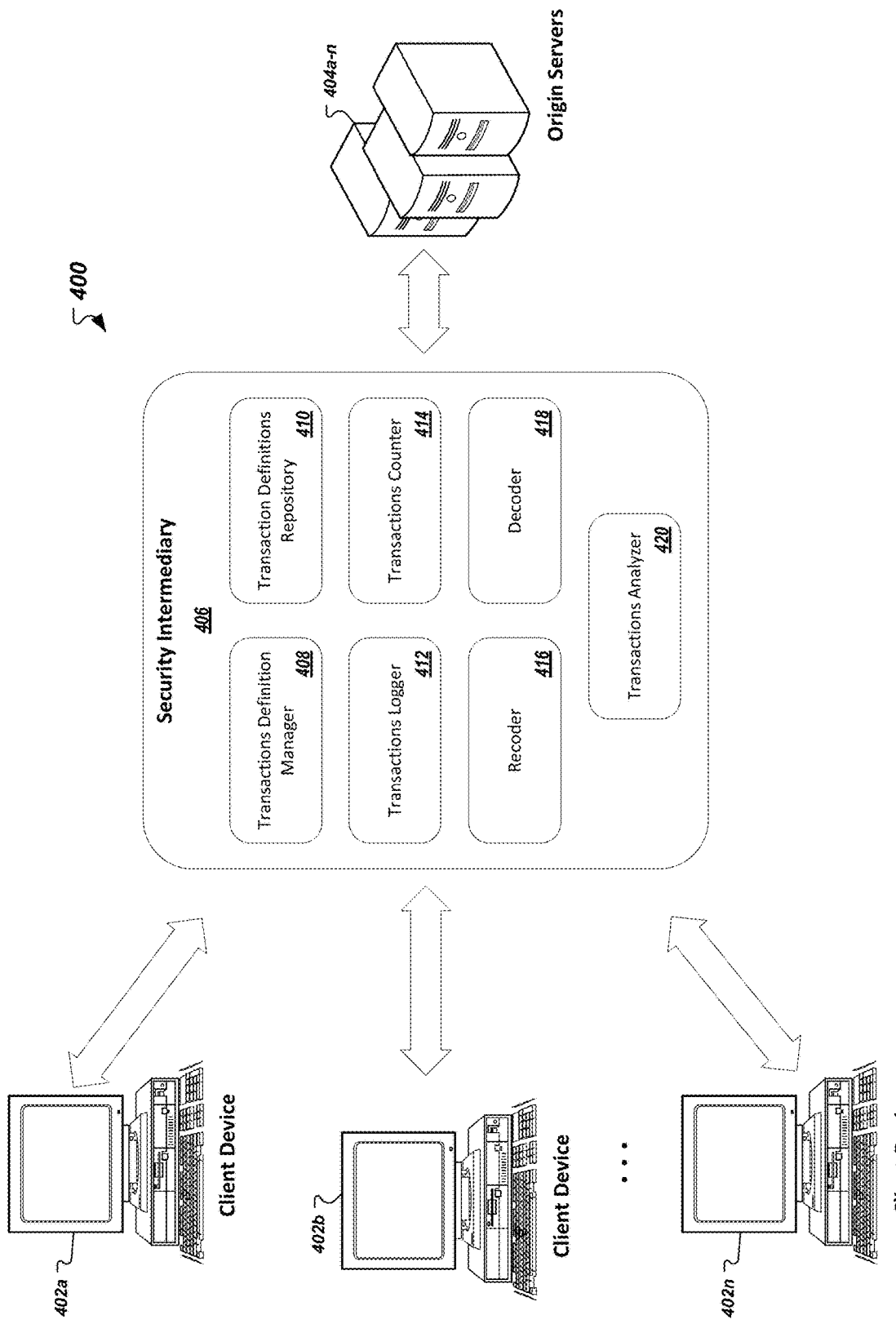
FIG. 4 depicts a schematic diagram of an example system including a security intermediary configured to intercept messages communicated between client devices and one or more origin web servers, to recode the messages according to one or more security policies, and to detect and analyze the results of transactions communicated between the client devices and the origin web servers.

Referring now to FIG. 4, a schematic diagram is shown of an example computer-implemented system 400 including a security intermediary 406 for intercepting messages communicated between client devices 402a-n and one or more origin (host) web servers 404a-n, re-coding the messages according to one or more security policies, and detecting and analyzing the results of transactions communicated between the client devices 402a-n and the origin web servers 404a-n. In some implementations, the system 400 may be configured to perform in whole or in part the computer-implemented methods that are described throughout this document, including the process 300 from FIGS. 3A and 3B. In some implementations, the components of the system 400 may generally perform be configured to perform the operations of like components referred to elsewhere in the document. For example, security intermediary 406 may be configured to perform operations like those of security intermediary 104

(FIG. 1A), intermediary computing system 122 (FIG. 1B), and the security servers 502a-n (FIG. 5).

In some implementations, the security intermediary 406 is arranged as a full proxy server to the origin web servers 404a-n. Messages transmitted over the Internet or other network, and between the client devices 402a-n and origin servers 404a-n, may be routed through the security intermediary 406 for processing. For example, the security intermediary 406 may parse the messages to determine a status of transactions indicated by the messages, and may also recode and de-code content transmitted between the clients 402a-n and origin servers 404a-n. The security intermediary 406 may include a transactions definition manager 408, a transactions definitions repository 410, a transactions logger 412, a transactions counter 414, a recoder 416, a de-coder 418, a transactions analyzer 420, or a combination of any one or more of these. The intermediary 406 may further include one or more communications interfaces that allow the intermediary 406 to bi-directionally communicate locally or over a network with the origin servers 404a-n and the client devices 402a-n.

The transactions definition manager 408 provides an interface for administrators or other users to configure transaction-type definitions and to create, modify, or delete expression patterns. The transactions definitions repository 410 is a database or other data structure in which the transaction-type definitions are stored. The transactions analyzer 420 identifies and correlates messages pertaining to a particular transaction, and evaluates the message with respect to the transaction-type definitions (and expression patterns contained therein) to determine a result or status of the particular transaction to which the messages pertain. The transactions logger 412 maintains a log of information about tracked transactions, including their determined statuses and other information about the transactions and the circumstances in which the transactions occurred. The transactions counter 414 maintains aggregate counts for one or more types of transactions and their different statuses over a period of time. The recoder 416 is configured to recode content served from the origin servers 404a-n to the client devices 402a-n according to one or more security countermeasures, so as to obfuscate content and prevent it from being used as a mechanism to exploit the origin servers 404a-n. Later, when the client devices 402a-n send responses and requests initiated from recoded content, the decoder 418 is configured to apply reverse transformations to these messages to restore them to an original form that may be understood by the origin servers 404a-n. Collectively, the recoder 416 and de-coder 418 may operate similarly to the decode, analysis, and re-encode module 524 (FIG. 5).

FIG. 5 shows a system 500 for serving polymorphic and instrumented code. The system 500 may be adapted to perform deflection and detection of malicious activity with respect to a web server system. The system 500 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 504a-504n, and could include a broad array of web servers, content servers, database servers, financial servers, load balancers, and other necessary components (either as physical or virtual servers).

A set of security server systems 502a to 502n are shown connected between the web servers 504a to 504n and a network 510 such as the internet.

Although both extend to n in number, the actual number of sub-systems could vary. For example, certain of the customers could install two separate security server systems to serve all of their web server systems (which could be one or more), such as for redundancy purposes. The particular security server systems 502a-502n may be matched to particular ones of the web server systems 504a-504n, or they may be at separate sites, and all of the web servers for various different customers may be provided with services by a single common set of security servers 502a-502n (e.g., when all of the server systems are at a single co-location facility so that bandwidth issues are minimized).

Each of the security server systems 502a-502n may be arranged and programmed to carry out operations like those discussed above and below and other operations. For example, a policy engine 520 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer.

When such code returns, the policy information may be provided to a de-code, analysis, and re-encode module 524, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 502a-502n, such as by the security servers 502a-502n implementing a web crawler (not shown) like web crawler 162 in FIG. 1 to recursively search for new and changed content and to report such occurrences to the security servers 502a-502n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 522 may store analytical rules for performing such analysis and for re-encoding of the content. The rules engine 522 may be populated with rules developed through operator observation of particular content types, such as by operators of a system studying typical web pages that call JavaScript content and recognizing that a particular method is frequently used in a particular manner. Such observation may result in the rules engine 522 being programmed to identify the method and calls to the method so that they can all be grouped and re-encoded in a consistent and coordinated manner.

The de-code, analysis, and re-encode module 524 encodes content being passed to client computers from a web server according to relevant policies and rules. The module 524 also reverse encodes requests from the client computers to the relevant web server or servers. For example, a web page may be served with a particular parameter, and may refer to JavaScript that references that same parameter. The de-code, analysis, and re-encode module 524 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and de-codes such strings can be maintained by the security server system 502 along with an identifier for the particular client computer so that the system 502 may know which key or function to apply, and may otherwise maintain a state for the client computer and its session. A stateless approach may also be employed, whereby the system 502 encrypts the state and stores it in a cookie that is saved at the relevant client computer. The client computer may then pass that cookie data back when it passes the information that needs to be de-coded back to its original status. With the cookie data, the system 502 may use a private key to decrypt the state information and use that state information in real-time to de-code the information from the client computer. Such a stateless implementation may create benefits such as less management overhead for the server system 502 (e.g., for tracking state, for storing state, and for performing clean-up of stored state information as sessions time out or otherwise end) and as a result, higher overall throughput.

The de-code, analysis, and re-encode module 524 and the security server system 502 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The de-code, analysis, and re-encode module 524 may be adapted to apply different modifications to each instance of a common web resource, or common portion of a web resource, such that the web code that it is ultimately delivered to the client computers in response to each request for the common web resource includes different modifications.

Such modification may occur according to a process that analyzes the code once for each time it changes in a material way, and then applies the analysis multiple times. For example, elements that can be changed without affecting the presentation of a web page may be located by way of analysis, as may additional instances of those elements through all the code (e.g., HTML, CSS, and JavaScript). A mapping may be made of the types and locations of such elements. Then, each time the code is to be served, the mapping may be used to place random characters or other substitute content in place of each occurrence of each such element. This repeated process may be performed, in certain implementations, with much less computational overhead than would a combined reanalysis and substitution for every serving.

The security server system 502 can apply the modifications in a manner that does not substantially affect a way that the user interacts with the resource, regardless of the different transformations applied, even where different modifications are applied in responding to multiple requests for a common web resource. For example, when two different client computers request a common web page, the security server system 502 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 526 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other metadata that is helpful in characterizing the activity. Such information can be used to help determine whether the action was malicious or benign.

The security servers 502a-n may also include a transactions manager 527. The transactions manager 527 is generally configured to track the results or other statuses of transactions that are requested to be performed by the web servers 504a-n. The transactions manager 527 may maintain a repository of transaction-type definitions that indicate various parameters of transactions that the web servers 504a-n are capable of performing. The definitions may further include expression patterns that indicate distinctive characteristics of messages relating to particular transactions, and that are served between the web servers 504a-n and the client devices. The transactions manager 527 may compare expressions and other characteristics of messages processed by the security servers 502a-n with the expression patterns in the transaction-type definitions. Based on results of the comparison, statuses of the transactions indicated by the messages may be determined. The transactions manager 527 may track/aggregate status information for detected transactions over time, may store the information in a log, and may maintain aggregate counts of transaction statuses, for example. In some implementations, information about the tracked transactions may be provided to the decode, analysis, and re-encode module 524. The decode, analysis, and re-encode module 524 may then automatically make adjustments to a manner in which content is re-coded based on the information shared by the transactions manager 527.

The instrumentation code may also analyze the DOM on a client computer in predetermined manners that are likely to identify the presence of and operation of malicious software, and to report to the security servers 502 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 502, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 504a-504n, as encoded by de-code, analysis, and re-encode module 524, may be rendered on web browsers of various client computers. Uninfected client computers 512a-512n represent computers that do not have malicious code programmed to interfere with a particular site a user visits or to otherwise perform malicious activity. Infected client computers 514a-514n represent computers that do have malware or malicious code (218a-518n, respectively) programmed to interfere with a particular site a user visits or to otherwise perform malicious activity. In certain implementations, the client computers 512, 514 may also store the encrypted cookies discussed above and pass such cookies back through the network 510. The client computers 512, 514 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 512, 514. For small-scale analysis, each web site operator may be provided with a single security console 507 that provides analytical tools for a single site or group of sites. For example, the console 507 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 507 may also be multiple different consoles used by different employees of an operator of the system 500, and may be used for pre-analysis of web content before it is served, as part of determining how best to apply polymorphic transformations to the web code. For example, in combined manual and automatic analysis like that described above, an operator at console 507 may form or apply rules 522 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 508 may connect to a large number of web content providers, and may be run, for example, by an organization that provides the software for operating the security server systems 502a-502n—an organization separate from the organizations that serve the content. Such console 508 may access complex analytical and data analysis tools, such as tools that identify clustering of abnormal activities across thousands of client computers and sessions, so that an operator of the console 508 can focus on those clusters in order to diagnose them as malicious or benign, and then take steps to thwart any malicious activity.

In certain other implementations, the console 508 may have access to software for analyzing telemetry data received from a very large number of client computers that execute instrumentation code provided by the system 500. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 508 to identify what is "natural" interaction with a particular page that is likely the result of legitimate human actions, and what is "unnatural" interaction that is likely the result of a bot interacting with the content.

Statistical and machine learning methods may be used to identify patterns in such telemetry data, and to resolve bot candidates to particular client computers. Such client computers may then be handled in special manners by the system 500, may be blocked from interaction, or may have their operators notified that their computer is potentially running malicious software (e.g., by sending an e-mail to an account holder of a computer so that the malicious software cannot intercept it easily).

Figure 6:
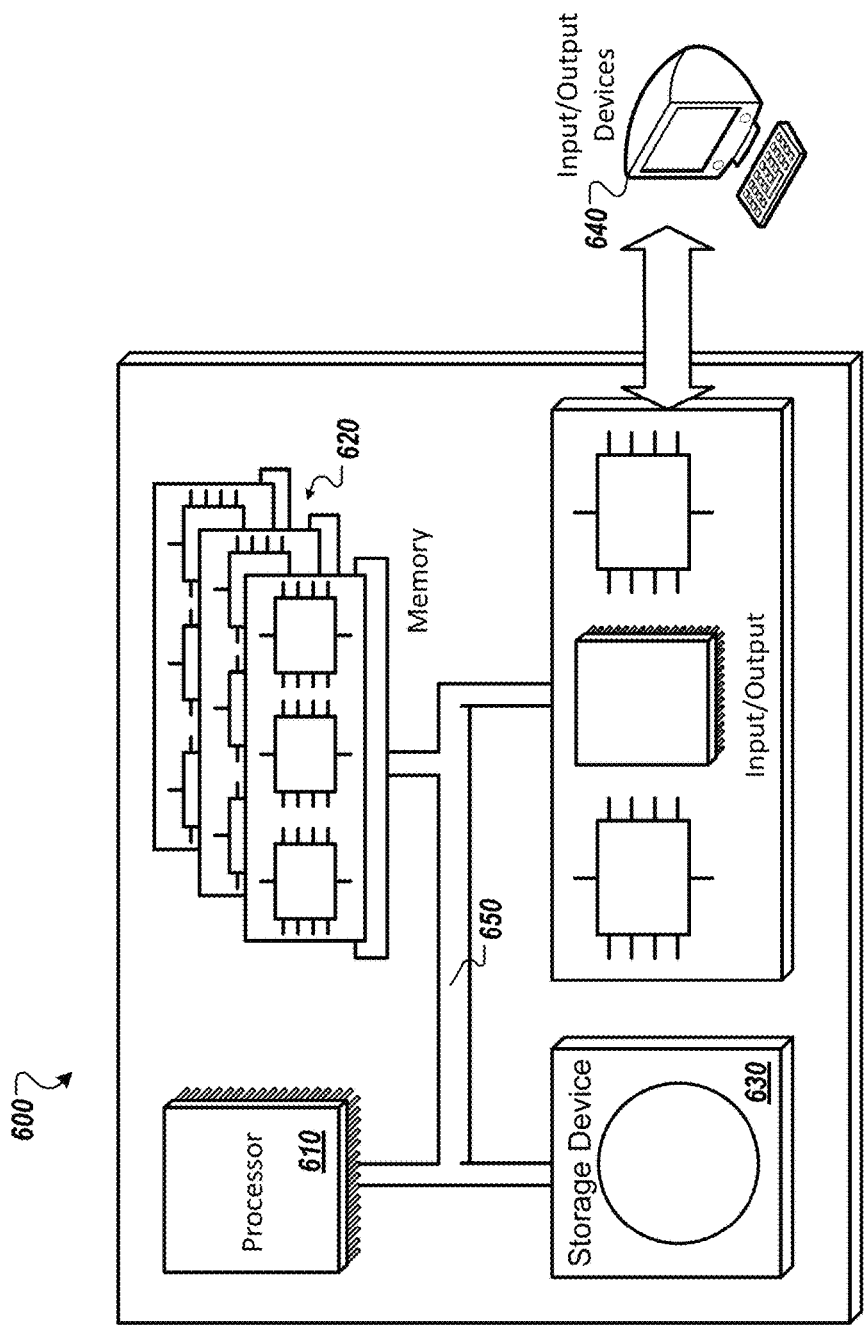
FIG. 6 depicts a schematic diagram of an example computer system that can be used to perform the operations associated with the computer-implemented methods and other techniques described herein.

FIG. 6 is a schematic diagram of a computer system 600. The system 600 can be used to carry out the operations described in association with any of the computer-implemented methods described previously, according to one implementation. The system 600 is intended to include various forms of digital computers, such as laptops, desktops, workstations, personal digital assistants, serves, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor.

In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data.

Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented by a security management system comprising one or more security intermediary apparatuses, client devices, or server devices, the method comprising:
    applying a set of security countermeasures to web transactions of a particular transaction type involving a web server system;
    determining a first expression pattern that occurs in response messages served by the web server system in response to successful transactions of the particular transaction type, wherein the determining the first expression pattern further comprises correlating two or more of the response messages when related to one of the transactions before the determination of the first expression pattern for the correlated response messages;
    determining a second expression pattern that occurs in response messages served by the web server system in response to unsuccessful transactions of the particular transaction type, wherein the determining the second expression pattern further comprises correlating two or more of the response messages when related to one of the transactions before the determination of the second expression pattern for the correlated response messages;
    intercepting a plurality of responses messages served by the web server system for a plurality of transactions of the particular transaction type requested by a plurality of client computing devices;
    determining a status for each of the plurality of transactions based on matching the first expression pattern and the second expression pattern to the response messages;
    updating aggregate status information for the particular transaction type based on the status for the plurality of transactions; and
    based on a change in the aggregate status information, updating the set of one or more security countermeasures.

2. The computer-implemented method of claim 1, wherein the change in the aggregate status information comprises a change in a ratio of successful transactions to unsuccessful transactions.

3. The computer-implemented method of claim 1, wherein the determining the first expression pattern and the determining the second expression pattern comprises evaluating code corresponding to response messages served by the web server system.

4. The computer-implemented method of claim 1, wherein the determining the first expression pattern and the determining the second expression pattern comprising receiving and processing user-defined configuration data that specifies the first expression pattern and the second expression pattern.

5. The computer-implemented method of claim 1, wherein the determining the first expression pattern and the determining the second expression pattern comprises generating the first expression pattern and the second expression pattern based on a model that automatically determines distinctive characteristics of model web page content served by the web server system regarding the particular transaction type that describe different statuses for the particular transaction type, wherein the model web page content includes web code that corresponds to a success status for the particular transaction type and web code that corresponds to a non-success status for the particular transaction type.

6. A computer system comprising:
    one or more hardware processors;
    at least one memory coupled to the one or more hardware processors and storing one or more instructions which, when executed by the one or more hardware processors, cause the one or more hardware processors to:
    apply a set of security countermeasures to web transactions of a particular transaction type involving a web server system;
    determine a first expression pattern that occurs in response messages served by the web server system in response to successful transactions of the particular transaction type, wherein the determine the first expression pattern further comprises correlating two or more of the response messages when related to one of the transactions before the determination of the first expression pattern for the correlated response messages;
    determine a second expression pattern that occurs in response messages served by the web server system in response to unsuccessful transactions of the particular transaction type, wherein the determine the second expression pattern further comprises correlating two or more of the response messages when related to one of the transactions before the determination of the second expression pattern for the correlated response messages;
    intercept a plurality of responses messages served by the web server system for a plurality of transactions of the particular transaction type requested by a plurality of client computing devices;
    determine a status for each of the plurality of transactions based on matching the first expression pattern and the second expression pattern to the response messages;
    update aggregate status information for the particular transaction type based on the status for the plurality of transactions; and
    based on a change in the aggregate status information, update the set of one or more security countermeasures.

7. The computer system of claim 6, wherein the change in the aggregate status information comprises a change in a ratio of successful transactions to unsuccessful transactions.

8. The computer system of claim 6, wherein the determining the first expression pattern and the determining the second expression pattern comprises evaluating code corresponding to response messages served by the web server system.

9. The computer system of claim 6, wherein the determining the first expression pattern and the determining the second expression pattern comprising receiving and processing user-defined configuration data that specifies the first expression pattern and the second expression pattern.

10. The computer system of claim 6, wherein the determining the first expression pattern and the determining the second expression pattern comprises generating the first expression pattern and the second expression pattern based on a model that automatically determines distinctive characteristics of model web page content served by the web server system regarding the particular transaction type that describe different statuses for the particular transaction type, wherein the model web page content includes web code that corresponds to a success status for the particular transaction type and web code that corresponds to a non-success status for the particular transaction type.

11. A non-transitory computer readable medium having stored thereon instructions comprising executable code that, when executed by one or more processors, causes the processors to:
apply a set of security countermeasures to web transactions of a particular transaction type involving a web server system;
determine a first expression pattern that occurs in response messages served by the web server system in response to successful transactions of the particular transaction type, wherein the determine the first expression pattern further comprises correlating two or more of the response messages when related to one of the transactions before the determination of the first expression pattern for the correlated response messages;
determine a second expression pattern that occurs in response messages served by the web server system in response to unsuccessful transactions of the particular transaction type, wherein the determine the second expression pattern further comprises correlating two or more of the response messages when related to one of the transactions before the determination of the second expression pattern for the correlated response messages;
intercept a plurality of responses messages served by the web server system for a plurality of transactions of the particular transaction type requested by a plurality of client computing devices;
determine a status for each of the plurality of transactions based on matching the first expression pattern and the second expression pattern to the response messages;
update aggregate status information for the particular transaction type based on the status for the plurality of transactions; and
based on a change in the aggregate status information, update the set of one or more security countermeasures.

12. The non-transitory computer readable medium of claim 11, wherein the change in the aggregate status information comprises a change in a ratio of successful transactions to unsuccessful transactions.

13. The non-transitory computer readable medium of claim 11, wherein for the determining the first expression pattern and the determining the second expression pattern, the executable code, when executed by the processors, further causes the processors to:
evaluate code corresponding to response messages served by the web server system.

14. The non-transitory computer readable medium of claim 11, wherein for the determining the first expression pattern and the determining the second expression pattern, the executable code, when executed by the processors, further causes the processors to:
receive and process user-defined configuration data that specifies the first expression pattern and the second expression pattern.

15. The non-transitory computer readable medium of claim 11, wherein for the determining the first expression pattern and the determining the second expression pattern, the executable code, when executed by the processors, further causes the processors to:
generate the first expression pattern and the second expression pattern based on a model that automatically determines distinctive characteristics of model web page content served by the web server system regarding the particular transaction type that describe different statuses for the particular transaction type, wherein the model web page content includes web code that corresponds to a success status for the particular transaction type and web code that corresponds to a non-success status for the particular transaction type.

16. A network traffic management system, comprising one or more network traffic management apparatuses, server devices, or client devices with memory comprising programmed instructions stored thereon and one or more processors configured to be capable of executing the stored programmed instructions to:
apply a set of security countermeasures to web transactions of a particular transaction type involving a web server system;
determine a first expression pattern that occurs in response messages served by the web server system in response to successful transactions of the particular transaction type, wherein the determine the first expression pattern further comprises correlating two or more of the response messages when related to one of the transactions before the determination of the first expression pattern for the correlated response messages;
determine a second expression pattern that occurs in response messages served by the web server system in response to unsuccessful transactions of the particular transaction type, wherein the determine the second expression pattern further comprises correlating two or more of the response messages when related to one of the transactions before the determination of the second expression pattern for the correlated response messages;
intercept a plurality of responses messages served by the web server system for a plurality of transactions of the particular transaction type requested by a plurality of client computing devices;
determine a status for each of the plurality of transactions based on matching the first expression pattern and the second expression pattern to the response messages;
update aggregate status information for the particular transaction type based on the status for the plurality of transactions; and
based on a change in the aggregate status information, update the set of one or more security countermeasures.

17. The system of claim 11, wherein the change in the aggregate status information comprises a change in a ratio of successful transactions to unsuccessful transactions.

18. The system of claim 11, wherein for the determining the first expression pattern and the determining the second expression pattern, the processors are further configured to be capable of executing the stored programmed instructions to:

evaluate code corresponding to response messages served by the web server system.

19. The system of claim 11, wherein for the determining the first expression pattern and the determining the second expression pattern, the executable code, when executed by the processors, the processors are further configured to be capable of executing the stored programmed instructions to:

receive and process user-defined configuration data that specifies the first expression pattern and the second expression pattern.

20. The system of claim 11, wherein for the determining the first expression pattern and the determining the second expression pattern, the processors are further configured to be capable of executing the stored programmed instructions to:

generate the first expression pattern and the second expression pattern based on a model that automatically determines distinctive characteristics of model web page content served by the web server system regarding the particular transaction type that describe different statuses for the particular transaction type, wherein the model web page content includes web code that corresponds to a success status for the particular transaction type and web code that corresponds to a non-success status for the particular transaction type.

* * * * *